US012715521B2

(12) United States Patent
Poyntz

(10) Patent No.: US 12,715,521 B2
(45) Date of Patent: Aug. 25, 2026

(54) TRAILER ENCLOSURE SYSTEM WITH RETRACTABLE ROOF FRAME

(71) Applicant: Poyntz Covered Systems Inc., Zephyr (CA)

(72) Inventor: Philip Poyntz, Sutton (CA)

(73) Assignee: Poyntz Covered Systems Inc., Zephyr (CA)

( * ) Notice: Subject to any disclaimer, the term of this patent is extended or adjusted under 35 U.S.C. 154(b) by 200 days.

(21) Appl. No.: 18/754,589

(22) Filed: Jun. 26, 2024

(65) Prior Publication Data

US 2025/0019013 A1 Jan. 16, 2025

Related U.S. Application Data

(60) Provisional application No. 63/526,237, filed on Jul. 12, 2023.

(51) Int. Cl.

*B62D 33/04* (2006.01)
*B60J 5/06* (2006.01)
*B60J 7/08* (2006.01)
*B60P 7/04* (2006.01)

(52) U.S. Cl.

CPC .............. *B62D 33/04* (2013.01); *B60J 5/065* (2013.01); *B60J 7/085* (2013.01); *B60P 7/04* (2013.01)

(58) Field of Classification Search

CPC . B60J 5/065; B60J 7/085; B62D 33/04; B60P 7/04

See application file for complete search history.

(56) References Cited

U.S. PATENT DOCUMENTS

| | | | |
|---|---|---|---|
| 473,292 | A | 4/1892 | Campbell |
| 2,976,082 | A | 3/1961 | Dahlman |
| RE31,746 | E | 11/1984 | Dimmer |
| 4,484,777 | A | 11/1984 | Michel |
| 4,834,445 | A | 5/1989 | Odegaard |

(Continued)

FOREIGN PATENT DOCUMENTS

| | | | |
|---|---|---|---|
| EP | 1 070 617 | 1/2001 | |
| EP | 4043281 A1 * | 8/2022 | .............. B60J 7/085 |

(Continued)

OTHER PUBLICATIONS

Truck and Trailer, Aug. 2002, p. 3.

(Continued)

*Primary Examiner* — Daniel J Colilla
(74) *Attorney, Agent, or Firm* — Hamilton, Brook, Smith & Reynolds, P.C.

(57) ABSTRACT

A retractable trailer enclosure system including a flexible tarpaulin adapted to cover the surface of a flatbed trailer and a roof frame for supporting the tarpaulin over the trailer head. The tarpaulin is at least partially retractable by selectively coiling one or both longitudinal sides to facilitate trailer loading and/or unloading. The roof frame includes one or more displaceable frame sections having one or elongated rafter support arms. The rafter support arms are pivotally movable under the weight of the tarpaulin between a lowered, generally horizontal position when the tarpaulin is uncoiled, and a raised inclined position when the tarpaulin is retracted and a longitudinal edge of the frame section is pivoted upwardly.

21 Claims, 16 Drawing Sheets

(56) References Cited

U.S. PATENT DOCUMENTS

| | | | | |
|---|---|---|---|---|
| 5,002,328 | A | 3/1991 | Michel | |
| 5,152,575 | A | 10/1992 | DeMonte et al. | |
| 5,303,972 | A | 4/1994 | Heider et al. | |
| 5,328,228 | A | 7/1994 | Klassen | |
| 5,429,403 | A * | 7/1995 | Brasher | B60J 7/085 296/10 |
| 5,466,030 | A | 11/1995 | Harris | |
| 5,658,037 | A | 8/1997 | Evans | |
| 5,765,901 | A | 6/1998 | Wilkens | |
| 6,199,935 | B1 | 3/2001 | Waltz et al. | |
| 6,206,449 | B1 | 3/2001 | Searfoss | |
| 6,513,856 | B1 | 2/2003 | Swanson et al. | |
| 6,527,331 | B2 | 3/2003 | Searfoss | |
| 6,641,199 | B1 | 11/2003 | Hicks | |
| 6,779,828 | B1 | 8/2004 | Poyntz | |
| 6,783,168 | B2 | 8/2004 | Searfoss | |
| 6,783,312 | B2 | 8/2004 | Smith | |
| 6,805,935 | B2 | 10/2004 | Ashida et al. | |
| 6,811,202 | B2 | 11/2004 | Hornady | |
| 6,926,337 | B2 | 8/2005 | Poyntz | |
| 8,226,150 | B1 | 7/2012 | Schmeichel | |
| 8,641,123 | B1 | 2/2014 | Royer | |
| 2002/0021018 | A1 | 2/2002 | Royer | |
| 2003/0090124 | A1 | 5/2003 | Nolan et al. | |
| 2004/0150244 | A1 | 8/2004 | Eggers et al. | |
| 2004/0189038 | A1 | 9/2004 | Nolan et al. | |
| 2004/0201240 | A1 | 10/2004 | Corbett | |
| 2004/0217622 | A1 | 11/2004 | Talbot | |
| 2021/0046813 | A1* | 2/2021 | Bashinski | B60P 7/04 |

FOREIGN PATENT DOCUMENTS

| | | | |
|---|---|---|---|
| GB | 2041839 | 9/1980 | |
| GB | 2066746 | 7/1981 | |
| GB | 2084241 | 4/1982 | |
| GB | 2236290 | 4/1991 | |
| GB | 2368880 A * | 5/2002 | B60J 7/085 |
| JP | 353093520 | 8/1978 | |

OTHER PUBLICATIONS

Truck and Trailer, Apr. 2002, vol. 16, No. 4, 1 page.
Truck and Trailer, Sep. 2002, p. 10—Roll-Tite.
Truck and Trailer, Aug. 2002, p. 31.
Truck and Trailer, Aug. 2002, vol. 16, No. 8—Roll-Tite, 1 page.
Truck and Trailer, Oct. 2002, p. 27.
Roll-Rite, 2001 brochure, pp. 6 to 9.
Shurco 2002 Tarps Catalog, pp. 16 to 41.
Cramaro Tarpaulin systems—Tarp-All Brochure, 4 pages.
Cramaro Tarpaulin Systems—Deluxe Side Kits Brochure, 2 pages.

* cited by examiner

TRAILER ENCLOSURE SYSTEM WITH RETRACTABLE ROOF FRAME

RELATED APPLICATIONS

This application claims priority to and the benefit of 35 USC § 119(e) to U.S. Provisional Patent Application Ser. No. 63/526,237, filed 12 Jul. 2023, the entirety of which is incorporated herein by reference.

SCOPE OF THE INVENTION

The present invention relates to a trailer enclosure system, and more particularly a side retractable enclosure system for covering the upper surface of a transport trailer or railcar bed. The enclosure system includes a flexible cover or tarpaulin, and an enclosure support frame used to support the cover or tarpaulin over the bed during transport. The support frame includes one or more roof frame subassemblies having one or more elongated rafter support arms, and which have mounted at their outermost ends at least one elongated purlin. The roof frame subassemblies as selectively movable between raised and lowered positions, as an edge portion of the cover is retracted or extended to facilitate bed side and/or top loading and unloading.

BACKGROUND OF THE INVENTION

When hauling palletized or bulk bagged goods such as sod, fertilizer, grains and other non-prepacked items, it is often desirable to ship the goods on the bed of a flatbed truck or train trailer. FIG. 1 shows a conventional side-retractable tarpaulin trailer enclosure system 12, such as is described in U.S. Pat. No. 6,779,828 B1, entitled "Retractable Truck Tarpaulin System", the entirety of which is incorporated herein by reference. The tarpaulin based trailer enclosure system 12 described is adapted to cover and secure goods which are transported on the rectangular bed 14 of a flatbed truck trailer 10. The enclosure system 12 includes a flexible tarp or tarpaulin 48 which is adapted to be coiled or uncoiled along each of its longitudinal side edges between retracted and deployed positions. When deployed, the flexible tarpaulin 48 is uncoiled and supported in position over the upper or horizontal upper bed surface 18 of the trailer bed 14 by a series of longitudinally spaced U-shaped steel bows 22.

Motor driven winding spindles 46 are respectively secured to each lower longitudinal edge portions 48*a*, 48*b* of the tarpaulin 48 with each longitudinal sides of the tarpaulin 48 retracted and extended in the same manner. The winding spindles 46 are used to effect tarp winding and unwinding about the spindle 46. By coiling and uncoiling the side portions 48*a*, 48*b* of the tarpaulin 48, about the spindles 46, it is possible to selectively raise or lower the tarpaulin sides, uncovering and covering the bed surface 18.

The spindles 46 are in turn movably supported at the trailer headboard and tailboard by associated pairs of telescoping pivot rods 24*a*, 26*a*, 24*b*, 26*b*, the selective journaled rotation of the spindle 46 positioned along the trailer side 16*a* in a first direction effects tarp coiling, causing the attached edge portion 48*a* of the tarpaulin 48 to wind about the spindle 46 and coil upwardly to expose the trailer bed side 16*a*. As the tarpaulin 48 coils about the spindle 46, the spindle 46 is tensioned and raised upwardly with the rotation of the pivot arms 24*a*, 26*a*. Uncoiling of the tarpaulin 48 is effected by rotating the motor driven spindle 46 in the reverse direction. This results in the edge portion of the tarpaulin 48*b* unfurling and the spindle 46 lowering with the pivot rods 24*a*, 26*a*. The spindle 46 supported by pivot rods 24*b*, 26*b* is operated in the identical manner. By selectively rotating each spindle 46, the edge portions of the tarpaulin 48*a*, 48*b* may be wound or unwound thereabout. In this manner each side of the tarpaulin 48 may be raised between a retracted position above the trailer bed surface 18, and with the associated pivot rods 24*a*, 26*a*, 24*b*, 26*b* rotated upwardly, providing access to the trailer bed 14 along the longitudinal trailer sides; and a lowered position where the spindles 46 are positioned at or below the bed surface 18, covering the trailer bed 14.

Conventional side retractable truck tarpaulin systems suffer disadvantages in that the use of U-shaped bows 22 to support the tarpaulin 48 may interfere with trailer loading. Frequently, trailer or railcar loading requires the use of forklifts to pick up and place palletized goods on the trailer bed surface 18. More recently, the bulk shipping industry has adopted more widespread use of large fabric totes or Nylon™ bags. Such fabric totes are often used to transport bulk unpackaged goods such as grains, fertilizer, soil, gravel or firewood. Typically, such totes are provided on each side with lift straps or loops requiring that the tote be raised and lowered onto the trailer bed surface 18 from above by a forklift or gantry. As a result, conventional trailer enclosure roof structures may present a physical obstacle or otherwise be subject to damage when loading or unloading bagged bulk goods.

To allow for more unhindered access to the flatbed trailer bed 18, various enclosure systems have been proposed which provide for the partial retraction of the trailer enclosure roof, to better facilitate top bed loading. Wingliner® of Eugendorf, Austria has developed a retractable box trailer enclosure system which incorporates moveable rigid side and top enclosure panels. One side of the Wingliner® bed enclosure is formed from a pair of rigid horizontally bifoldable upper and lower side panels. The foldable side panels in turn are pivotally mounted along a first longitudinal side of a rigid enclosure top panel the enclosure. The top panel is in turn mounted via a top panel hinge to a second rigid enclosure longitudinal side.

In use, extendable hydraulic arms are used to selectively fold the trailer side panels against each other and the top panel. The folded panel arrangement is then pivoted about the top panel hinge from a horizontal closed covering orientation, to an open inclined, partially open position allowing increased access to the enclosure bed. When fully open, the Wingliner® side panels are thus folded upwardly and flat against the top of the enclosure roof panel. The juxtaposed panels are then typically pivoted 70° and 90° along the opposing top panel hinge, to allow access to the trailer bed.

In addition to providing access along one side only, the Wingliner® system requires rigid top and side enclosure panels to be pivoted by way of hydraulic actuators, adding both weight and expense to the overall system.

U.S. Pat. No. 8,641,123 to Royer describes a retractable trailer enclosure system which incorporates a spindle wound flexible tarp which has secured thereto, a pair of longitudinally elongated rod-shaped attachment elements. The sides of the tarpaulin are secured to an associated winding spindle which is adapted to be journaled in rotation, allowing the tarp to be coiled with the attachment element about each longitudinal side to raised positions for side-loading. To support the tarp in an uncoiled extended position over the trailer bed, a series of individually operable spring loaded support arms are positioned at spaced locations above the trailer bed. The support arms extend laterally from a centrally disposed support and hingely mounted thereto so as to be pivotally between a generally horizontal and vertical upright positions. Each spring arm is provided with a torsion spring used resiliently biasing each arm upwardly to vertical orientation.

Each attachment element is secured to the tarpaulin in an orientation parallel to the winding spindle, and is provided as an arm actuator used to engage and reposition the individual support arms. As the tarp is wound, the spindle is coiled over the center portion of the trailer bed and moves inwardly past the arms. As the attachment member is moved inwardly from the support arms, the springs in turn bias each support arm to the upwardly raised vertical position, to provide increased clearance over the trailer bed.

As the tarpaulin is uncoiled, the unspooling tarp moves the attachment member laterally against the support arms. The weight of the attachment member and uncoiling tarp biases the support arms downwardly to return to a lowered position, allowing the attachment member to be repositioned outwardly with the unfurling tarp as an upper vertical edge support for the deployed tarpaulin.

The applicant has appreciated that incorporating elongated attachment members as component parts of the tarpaulin necessitates the manufacture assembly and maintenance of the tarpaulin in position over the support arms with exact tolerances and with precise precision alignment. In addition, individual torsion springs must be initially selected and tuned to each support arm to operate with a precise biasing force, whilst ensuring the desired orientation and spacing between the attachment member, each support arm, the tarp and winding spindles. For longer trailer lengths, the use of larger attachment members may be required, adding weight and placing increased lateral strain on both the tarpaulin fabric, as well as biasing springs used in the arm positioning.

In addition, the applicant has recognized that the requirement to fully wind the tarp to an inward coiled position, moved free from contact from the support arms and typically over the longitudinal center of the trailer bed, slows enclosure deployment and retraction, increasing trailer loading and/or unloading times.

SUMMARY OF THE INVENTION

Accordingly, one non-limiting object of the invention is to provide a trailer bed enclosure system which incorporates flexible cover, tarp or a tarpaulin (hereinafter collectively referred to as a tarpaulin) which is at least partially retractable along one and preferably both longitudinal sides, to allow for side access loading and unloading of the trailer bed. More preferably, when deployed, the tarpaulin is supported over top of the trailer bed by an enclosure frame assembly which includes one or more tarpaulin supporting roof frame sections, and which are partially repositionable vertically relative to the trailer bed, to facilitate the loading and/or unloading of the trailer bed by either forklift or overhead gantry.

Another non-limiting object of the invention is to provide a trailer enclosure system for a truck trailer, railcar or the like, and which has a frame supported flexible tarpaulin, and which incorporates one or more hinged roof frame sections which are mounted for pivotal movement between a lowered and raised positions, allowing for at least partial retraction and/or opening of the tarpaulin along trailer side to facilitate access to the trailer bed.

Most preferably an enclosure system is provided which includes a flexible tarpaulin and support frame therefor. The support frame includes one or more frame sections mounted for pivotal movement about pivot axis as a unit, and most preferably a pivot axis substantially parallel to an adjacent longitudinal trailer bed side. Preferably in a lowered deployed position, the moveable frame sections support an overlying portion of the tarp or tarpaulin in an orientation substantially covering the trailer bed.

In a non-limiting embodiment of the invention, a retractable trailer enclosure system is provided which incorporates a flexible tarpaulin which is adapted to cover the bed surface of a trailer, and preferably the sides of a flatbed trailer. In a preferred embodiment, the tarpaulin is supported over the trailer bed by a support frame which includes one or more pivotable movable roof frame subassemblies. More preferably, the roof frame subassemblies are provided with one or more longitudinal elongated purlin members which are adopted to support the tarpaulin over longitudinal sides of the trailer. The roof frame subassemblies positionable to maintain the flexible tarpaulin in a deployed position over goods transported on the trailer bed, so as to prevent rain, snow and/or wind damage thereto; as well as preventing debris from blowing off the trailer during transportation. The roof frame subassemblies may be selectively retracted to expose and permit enhanced access to the trailer bed surface, or extended to cover the trailer bed and any goods positioned thereon.

In a simplified construction, the enclosure system includes an elongated pivotally mounted winding spindle rotatably mounted along at least one trailer side or end. The spindle is configured to be journalled in rotation and raised and lowered to coil and uncoil an attached edge portion of the tarpaulin thereabout in its retractation and deployment. The tarpaulin is preferably sized and positioned so that when fully extended, it is stretched over the longitudinal length of the enclosure support frame, and preferably downwardly along and over the trailer sides with one, and preferably both, of its longitudinal edges secured to an associated spindle. The tarpaulin is at least partially retractable by selectively coiling one or both longitudinal sides or edges about the associates spindle to facilitate loading and/or unloading from the trailer sides.

In another embodiment, the enclosure system incorporates a support frame for supporting the tarpaulin in an extended orientation over the trailer bed. The support frame includes a pair of symmetrically positioned displaceable roof frame sections or subassemblies. Each roof frame subassembly has at least one, and preferably a number of generally parallel spaced elongated rafter support arms. The rafter support arms preferably each extend laterally from a first inner end to a second outer distal end which joins with a longitudinal elongated purlin. The inner ends of the rafter support arms are hingely mounted for pivotal movement about a pivot axis between a lower deployed and raised retracted positions. Most preferably, the rafter support arms are actuable in movement between the deployed and raised positions by the lateral shifting weight of a winding spool and/or at least part of the tarpaulin thereagainst. Preferably, in the lowered, deployed orientation, the rafter support arms assume generally horizontal position and wherein the tarpaulin may be fully uncoiled, and a raised inclined position where an adjacent edge of the tarpaulin is retracted and moved thereover by coiling about the spindle as it is raised to expose a longitudinal edge of the trailer side.

Most preferably, the enclosure system incorporates a pair of roof subframe assemblies which are symmetrically arranged along a longitudinal center of the trailer bed. Each roof subframe assembly includes a respective parallel array of rafter support arms mounted for pivotal movement about a respective pivot axis, and most preferably a common pivot axis which extends substantially parallel to a trailer bed side, between lowered deployed and raised retracted positions. Preferably in the lowered deployed position, the rafter support arms support an overlying portion of the flexible tarpaulin in an orientation substantially covering the underlying portion of the trailer bed, and with the purlin substantially aligned over the adjacent longitudinal edge of the trailer bed.

A lift assembly, which may include springs and/or telescoping pneumatic and/or hydraulic struts or actuators is provided to resiliently bias the roof frame subassembly to the raised retracted position. Preferably, the lift assembly is configured to apply a resiliently upward biasing force on at least part of the roof frame subassembly to resiliently bias the outer distal ends of the rafter support arms in rotation about the pivot axis to an upwardly inclined position under forces selected less than a minimum downward threshold force. Preferably, the minimum downward threshold force required to overcome the bias of the lift assembly is selected as the rotational downward torque force applied by the weight of the spindle and coiled portion of the tarpaulin wound thereabout when the spindle positioned a distance from the pivot axis at the force equivalent point, where the upward/biasing force of the lift assembly and downward torque force of the spindle and coiled tarpaulin are in equilibrium. In one non-limiting embodiment, the force equivalent point may be located along the rafter support arms a distance from the pivot axis selected at about 30% to about 70%, and most preferably about 40% to 60% of the overall lateral length of the rafter support arms. In other non-limiting embodiment, the force equivalence point may be selected as a point where the spindle and coiled edge portion of the tarpaulin wound thereafter are moved laterally inwardly past the pivot axis, and/or at points spaced laterally from the rafter support arms.

In another non-limiting embodiment, the range of pivotal movement of the rafter support arms may be selectively adjustable by a user to inclined orientations less than 90°, and most preferably, may be adjusted to a maximum inclination angle selected at between about 30° and 70°, and preferably between about 30° and 60°.

In another embodiment, the trailer enclosure system is provided as a side retractable trailer enclosure, and each roof frame subassembly includes an edge purlin fixedly secured along the outermost distal ends of the rafter support arms, so as to be movable therewith as a unit. At least one, and preferably two winding spindles are provided for coiling and uncoiling edge portions of the tarpaulin thereabout to provide access to the trailer bed. As a side edge portion of the tarpaulin is coiled about a spindle in the retraction of the cover, the winding moves the spindle and coiled tarpaulin edge initially vertically upwardly, and then laterally over the purlin member and on to the rafter support arms towards a storage position over a longitudinal center of the trailer. As the spindle and coiled edge moves laterally inwardly past the force equivalent point, the lift assemblies move the associated rafter support arms upwardly to the upwardly inclined retracted position, with the rafter support arms rotating about the pivot axis raising the purlin member and preferably the spindle and coiled edge of the cover therewith. In another non-limiting construction, the rafter support arms are hingely mounted to an associated vertical support. The lift assembly may include biasing assembly which may include in addition to or in place of springs, telescoping pneumatic and/or hydraulic struts or actuators which are coupled at an upper end to at least one rafter support arm, and at their lower end to the associated vertical support.

Preferably, the spindle is provided with an elongated length which extends substantially the longitudinal length of the trailer bed, from trailer headboard assembly to a tailboard assembly. In alternate configurations, shorter spindles and/or multiple covers or tarpaulins may also be used. The spindle is movably supported in an orientation with its axis generally parallel to the trailer bed surface, and where rotation of the spindle about its axis effects the coiling or uncoiling of the attached edge portion of the tarpaulin thereabout. In a non-limiting construction, the spindle is rotatably mounted at each end by an associated telescoping pivot rods of the type described in the applicant's earlier U.S. Pat. No. 6,779,828 B1.

In another non-limiting embodiment, the roof frame subassembly is adapted to at least partially support the spindle and a coiled portion of the tarpaulin wound thereabout in horizontal movement, as the roof frame subassembly pivoted upwardly to the raised position, to allow increased clearance between the coiled tarp and the trailer bed.

In another embodiment, the retractable trailer enclosure system incorporates one or more pivotally moveable roof frame sections which incorporate one or more elongated rafter support arms which incorporate an upwardly arcuate by curving top surface. The support arms are adapted to support a flexible tarpaulin in a deployed position over the bed of a trailer. The rafter support arms pivotally coupled at proximal ends to a respective vertical support post and extend laterally to distal outer ends. Each rafter support arm is hingely movable between a generally horizontal ±20° deployed position, and a retracted inclined position, where distal ends of the rafter support arms extend upwardly at an angle of at between about 45° to 90° from horizontal, and preferably between about 35° and 60°. A lift assembly, which includes a torsion spring, a helical compression spring, a gas strut or a hydraulic strut, or combinations thereof, is preferably provided to resiliently bias the rafter support arms from the deployed position to the retracted positions under downward forces selected lees than a predetermined downward force.

In a non-limiting construction, roof frame section may incorporate two, three or more rafter support arms which extend laterally towards a longitudinal side of the trailer head, and which fixedly support one or more longitudinally elongated purlins at their distal ends. The purlin members preferably extend the longitudinal length of the trailer bed. The rafter support arms are pivotally mounted at proximate ends to an arm support. The arm support is spaced vertically above the surface of the trailer bed and in non-limiting embodiments, comprise a rigid or fixed trailer enclosure or side panel. In an alternate constructions, rigid or fixed trailer or front rear walls may function either directly or indirectly with one or more longitudinal connecting joists as arm supports. In an alternate construction, arm mounting brackets may be provided on vertical support posts positioned at spaced locations directly on the surface trailer bed.

Although not essential, the trailer enclosure system most preferably allows for user adjustability in biasing force supplied by the lift assembly. In one non-limiting design, the vertical supports and/or rafter support arms may be configured to allow for the selective connection and mounting of lift assembly biasing members at different attachment points relative to the pivot axis. In this manner by varying the attachment points, the lift assembly biasing member may be used to vary the force equalization point where torque required to provide the threshold minimum force may be selected in relation to the weight of the selected enclosure system tarpaulin and/or winding spindle. In another embodiment, the lift assembly may include a torsion spring and an adjustable torsion spring tensioning clamp allows for user adjustability of the resilient spring force supplied by the torsion springs.

Accordingly, in one aspect, the present invention resides in a trailer enclosure system for selectively covering a trailer bed surface comprising, a flexible tarpaulin for covering a selected portion of said bed surface, a support frame including a support assembly and a roof frame section movably coupled to said support assembly, for selectively supporting said tarpaulin between an extended position, wherein said tarpaulin extends substantially over said selected portion, and a retracted position, wherein at least part of said tarpaulin is retracted to allow access to said selected portion to facilitate loading or unloading thereon, the support assembly configured for mounting the roof frame section spaced a vertical distance above said selected portion, the roof frame section including, at least two generally parallel spaced elongated rafter support arms, the rafter support arms extending from a first end to a second end, each rafter support arm being pivotally secured to the support assembly towards the first end for movement about a pivot axis between a deployed position, wherein said rafter support arms extend in a generally horizontal orientation over said portion of said bed surface, and a retracted position, wherein said rafter support arms extend angularly upwardly at an inclined angle of between about 15° and 90°, preferably at about 30° and 70°, and most preferably about 40° to 55°, and an elongated purlin coupled to the second ends of the support arms for movement therewith, an elongated spindle coupled to an edge portion of the tarpaulin and being supported for movement in a substantially horizontal orientation, a drive for selectively journaling the spindle in rotational movement, wherein rotation of the spindle by the drive winds or unwinds the tarpaulin about the spindle to retract or extend the tarpaulin over said portion of the bed surface.

In another aspect, the present invention resides in an enclosure system for a trailer bed surface comprising, a flexible tarpaulin for selectively covering a top, and preferably the longitudinal sides of said bed surface, a support frame for supporting said tarpaulin between an extended position, wherein said tarpaulin extends substantially over said bed surface, and a retracted position, wherein at least a longitudinal edge portion of said tarpaulin is retracted to a position spaced vertically above said trailer bed to facilitate loading or unloading thereon, the support frame including a laterally extending roof frame section and a support assembly configured for mounting the roof frame section spaced a vertical distance above said trailer bed, the roof frame section including, a pair of generally parallel spaced elongated rafter support arms, the rafter support arms extending from a first inner end spaced towards said support arm to a second outer end, and a rigid purlin member spanning between and coupled to each rafter support arm second end, each rafter support arm being mounted for movement about a pivot axis between a lowered deployed position, wherein said rafter support arms extend laterally over at least part of the top of said bed surface and said purlin member orients substantially above one said trailer bed side, and a raised position, wherein said outer ends of said rafter support arms are inclined angularly upwardly from horizontal at an angle of between about 15° and 90°, preferably at about 30° and 70°, and most preferably about 40° to 55°, and said purlin member is moved laterally inwardly over said top of said trailer bed, a lift assembly configured to resiliently bias the rafter support arms from said deployed position to said retracted position against downward forces selected less than a predetermined threshold force, an elongated spindle coupled to the longitudinal edge portion of the tarpaulin and being supported for movement in a substantially horizontal orientation, a drive for selectively journaling the spindle in rotational movement, whereby rotation of the spindle by the drive coils or uncoils the longitudinal edge portion of the tarpaulin about the spindle to position said tarpaulin between the extended and the retracted positions, and wherein the predetermined threshold force is selected as a downward rotational torque force of a combined weight of said spindle and coiled longitudinal edge portion of said tarpaulin at a force equivalent point along said rafter support arms intermediate said inner and outer ends.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
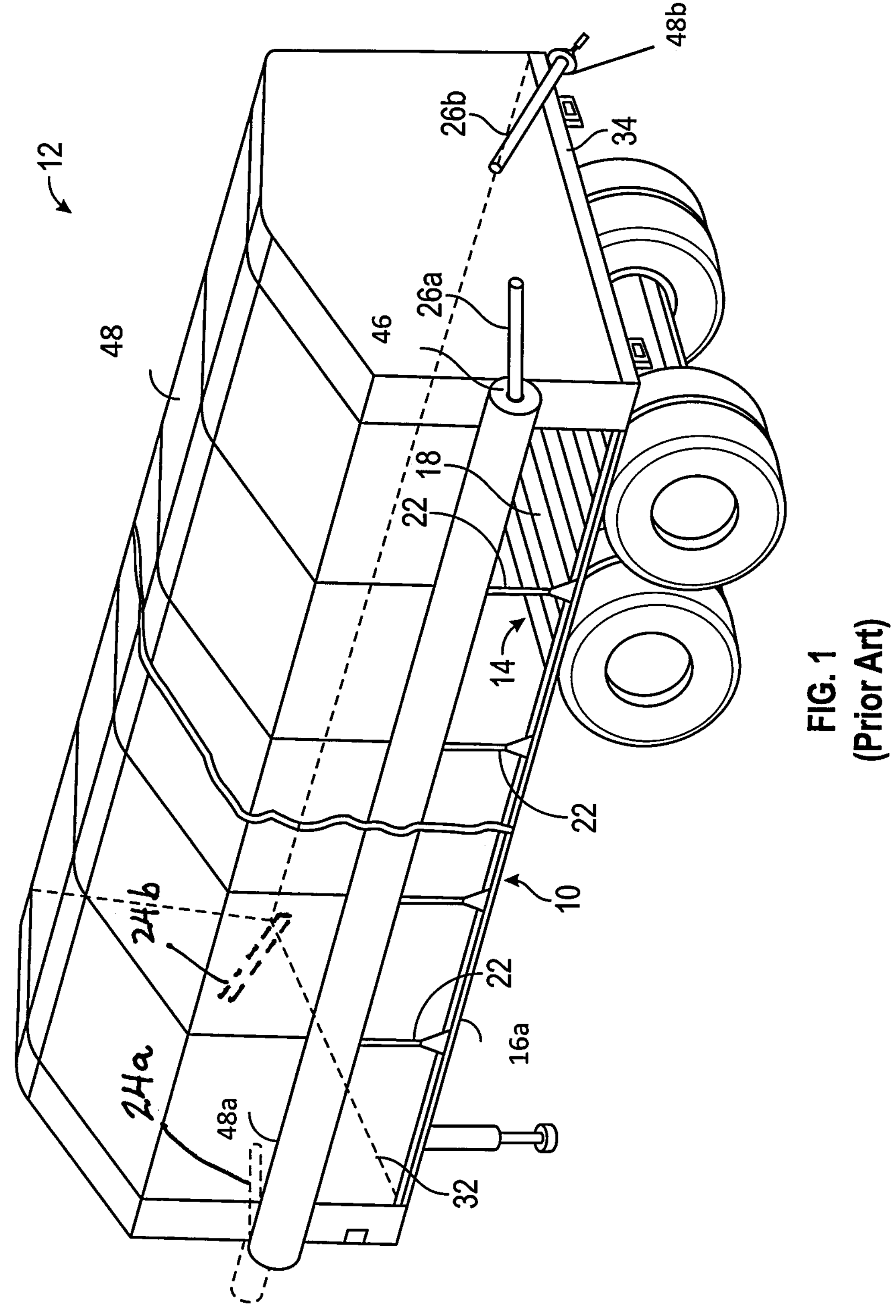
FIG. 1 illustrates a tractor trailer enclosure system which incorporates a conventional retractable tarpaulin and U-shaped bow support frame.
Figure 2:
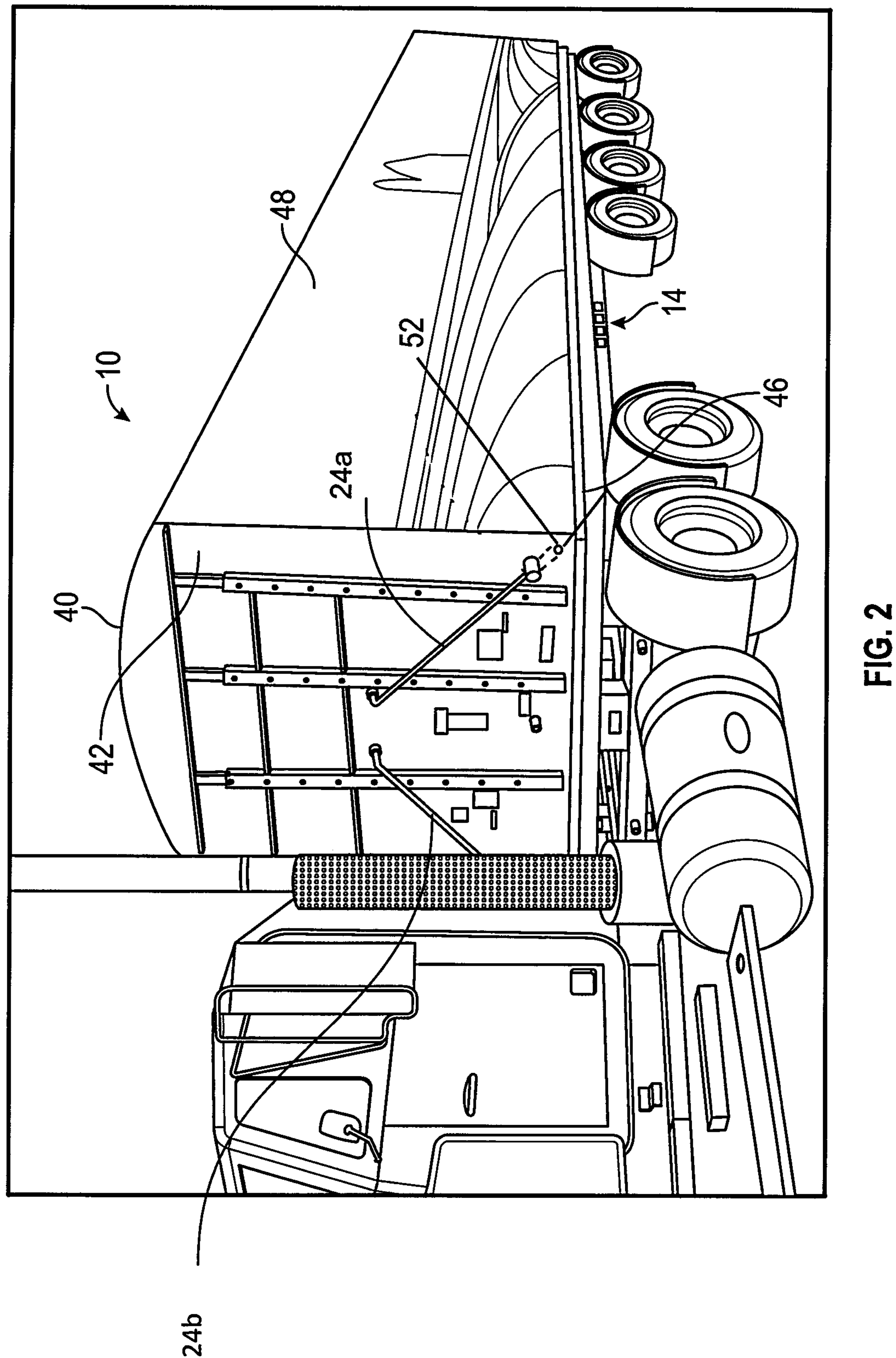
FIG. 2 shows a perspective view of a side retractable trailer enclosure system for covering a flatbed trailer according to a first embodiment of the invention, with a retractable tarpaulin in a fully deployed orientation.
Figure 3:
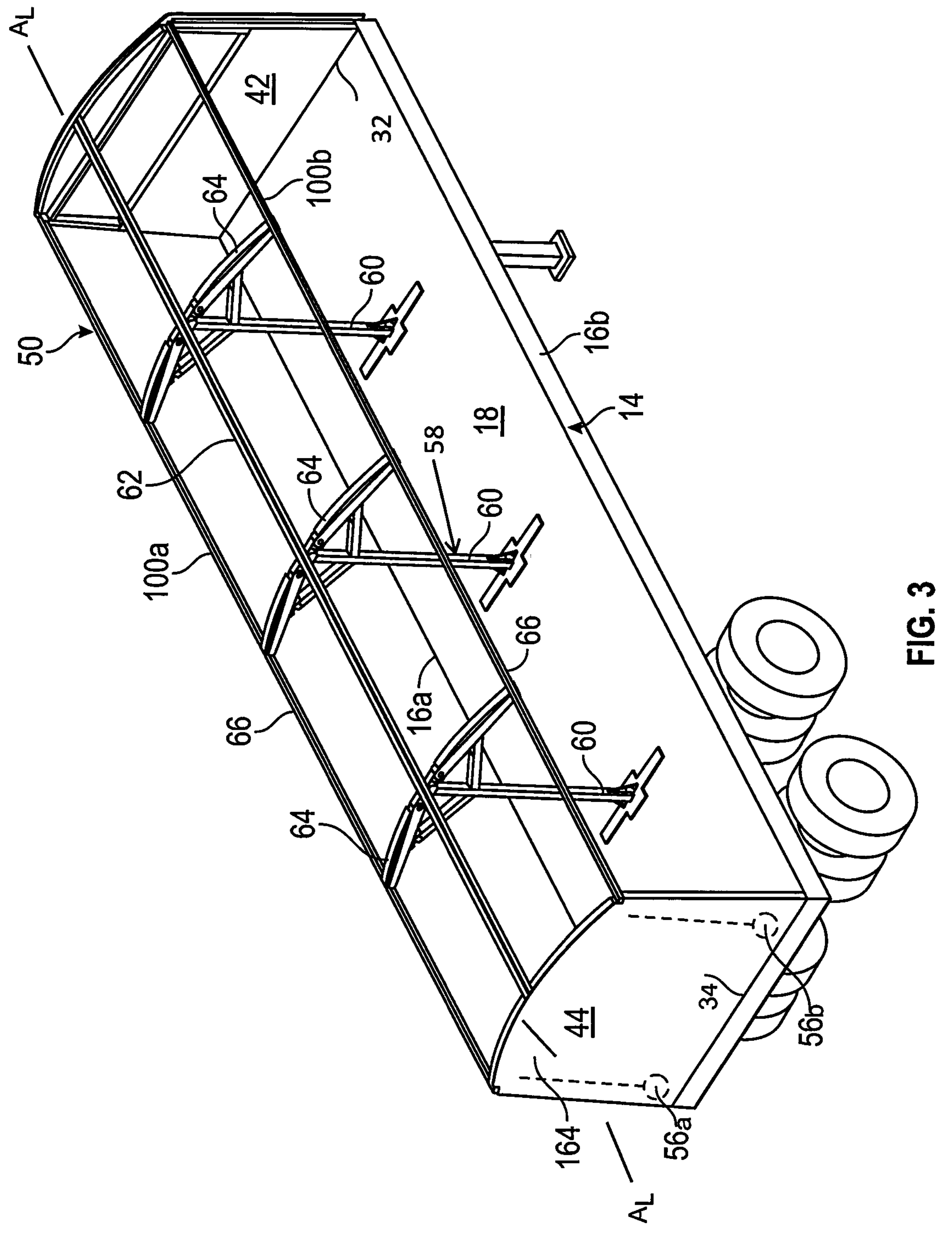
FIG. 3 illustrates schematically frame assembly used with the tarpaulin in the retractable trailer enclosure system shown in FIG. 2.

Reference may be had to FIG. 2 which illustrates a flatbed truck trailer 10 which incorporates a side retractable trailer enclosure system 40 in accordance with a preferred embodiment of the invention. Truck trailer 10 includes a flat, wheel mounted rectangular trailer bed 14 which as shown in FIG. 3, has a generally horizontal flat upper bed surface 18, parallel longitudinal sides 16*a*, 16*b* and front and rear ends 32, 34. Although not essential, preferably the trailer enclosure system 40 is formed with a symmetrically mirror construction relative to the longitudinal center axis $A_L$-$A_L$ of the trailer 14, allowing for loading and unloading of trailer bed 18 from either longitudinal side 16*a*, 16*b*.

The trailer enclosure system 40 is shown in FIGS. 2 and 3 as including a front headboard assembly 42, positioned and aligned over the front end 32, a rear tailboard assembly 44 positioned at and aligned over the rear end 34, a flexible tarpaulin 48, and an enclosure frame assembly 50. As will be described the enclosure frame assembly 50 includes a support frame 58 and a pair of roof frame subassemblies 100*a*, 100*b* configured to support the tarpaulin 48 in a deployed configuration extending over and covering the trailer bed surface 18 in the storage and/or transport of goods thereon; whilst allowing for the retraction of longitudinal side portions 48*a*, 48*b* of the tarpaulin to be retracted during trailer loading and unloading.

The tarpaulin 48 is preferably rectangular shaped and formed from a suitable flexile weatherproof fabric or material. Preferably the tarpaulin 48 has a longitudinal length selected to span the entirely longitudinal length of the trailer bed 14, between the headboard assembly 42 and tailboard assembly 44. The width of the tarpaulin 48 is selected to allow it to be deployed, extended over an enclosure frame assembly 50, to cover the trailer bed surface 18 with its longitudinal side portions 48*a*, 48*b* extending downwardly over the respective trailer sides 16*a*, 16*b*.

The front headboard assembly 42 and rear tailboard assembly 44 are mounted vertically and parallel to each other at the respective front and rear trailer ends 32, 34. FIG. 2 shows the front headboard assembly 42 as pivotally mounting a pair of telescoping pivot rods 24*a*, 24*b*. The rear tailboard assembly 44 mounts a pair of spring loaded recoil tensioners 56*a*, 56*b*. Each pivot rod and recoil tensioner pair 24*a*, 56*a* and 24*b*, 56*b* in turn rotatably and horizontally supports a respective end of an associated tarp winding spindle 46. The winding spindles 46 each extend the longitudinal length of the trailer bed 14, spanning from the front headboard assembly 42 to the rear tailboard assembly 44. Each winding spindle 46 is secured along a respective longitudinal tarp edge 48*a*, 48*b* and is used to effect coiling and uncoiling the longitudinal edge portions 48*a*, 48*b* of the tarpaulin 48 thereabout to raise and lower the tarpaulin 48 over the trailer bed 18 and bed sides 16*a*, 16*b*. The winding spindles 46 are each rotatably supported on the pivot rods 24*a*, 24*b* at their forwardmost end by way of a winding motor 52 which is selectively operable to journal each spindle 46 in rotational movement. The rearward end of each spindle 46 is movably supported by the recoil tensioner 56*a*, 56*b* such that the spindles 46 are maintained in a substantially horizontal orientation during winding and unwinding operation. The selective operation of the winding motor 52 journals the associated spindle 46 in rotation about its longitudinal axis, as to effect coiling or uncoiling of the attached side portion 48*a*, 48*b* of the tarpaulin 48 thereabout in the retraction and deployment of the enclosure system 40.

Access to the trailer bed 18 along each side 16*a*, 16*b* is effected by rotating the spindles 46 in the same manner. FIG. 2 illustrates the enclosure system 40 with each of the pivot rods 24*a*, 24*b* and recoil tensioners 56*a*, 56*b* positioned in lowered position relative to the front headboard assembly 42, with the tarp 48 fully uncoiled and deployed. To access trailer side 16*a*, the associated motor 52 is activated to rotate the adjacent spindle 46. The spindle rotation effects the coiling of the edge portion 48*a* the tarpaulin 48 about the spindle 46, and effects the upward rotation of the pivot rod 24*a*. As a spindle 46 rotates the attached edge portion 48*a* of the tarpaulin 48 is coiled thereabout. The coiling of the tarp 48 results in the spindle 46 being drawn initially vertically upward over the trailer side 16*a*, and then onto the top of the adjacent roof frame subassembly 100*a*. Most preferably, when in a fully extended position, the tarpaulin 48 extends over the enclosure frame assembly 50 and downwardly past each longitudinal side 16*a*, 16*b* of the trailer 10. Smaller tarpaulins 48 which extend only partially the longitudinal length of the trailer 10 and/or which extend only partially downwardly towards the trailer sides 16*a*, 16*b* may however be used.

Figure 4:
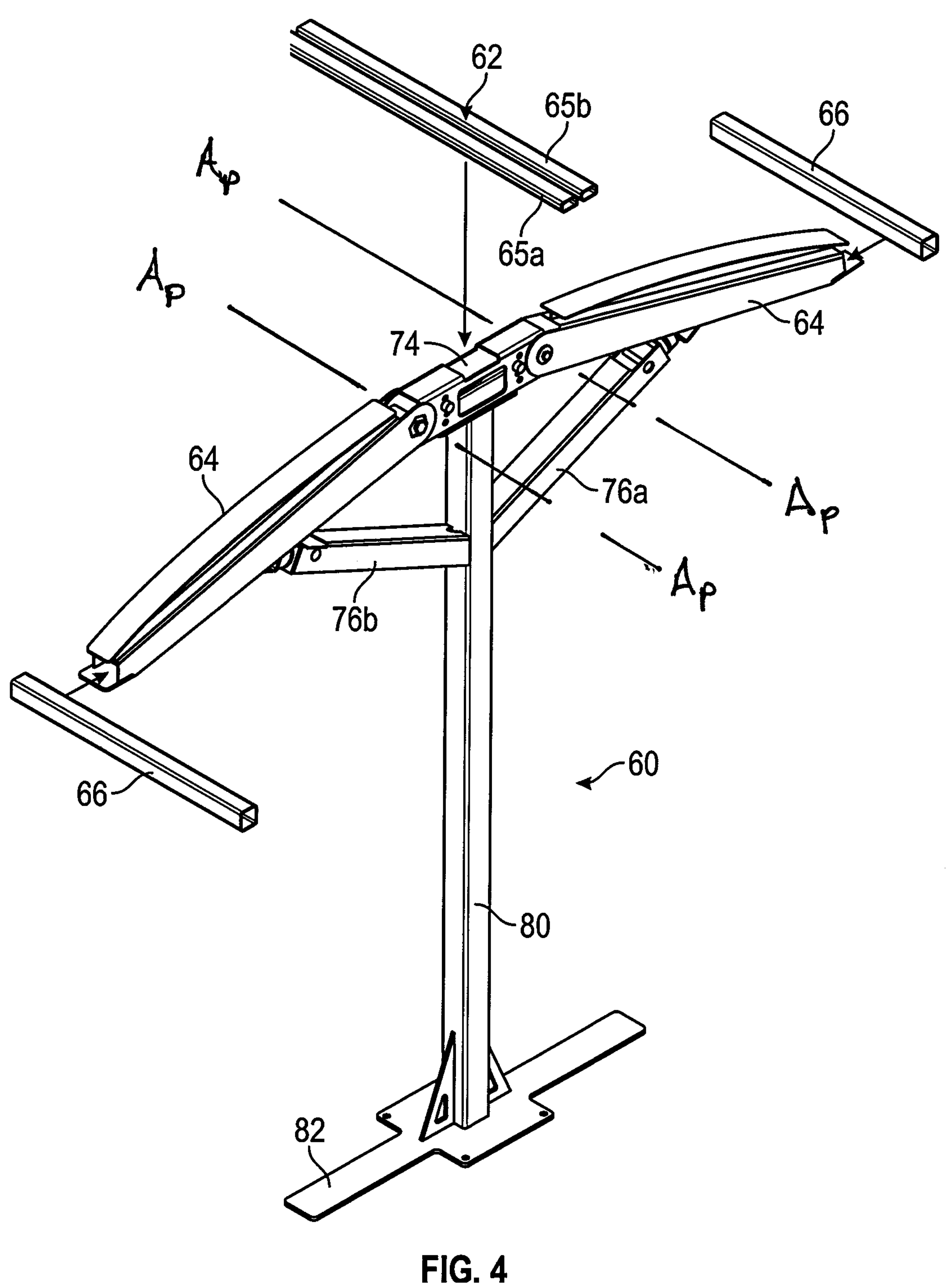
FIG. 4 illustrates an enlarged partial exploded view of a vertical support post, roof subframe assembly and ridge beam used in the frame assembly illustrated in FIG. 3.
Figure 5:
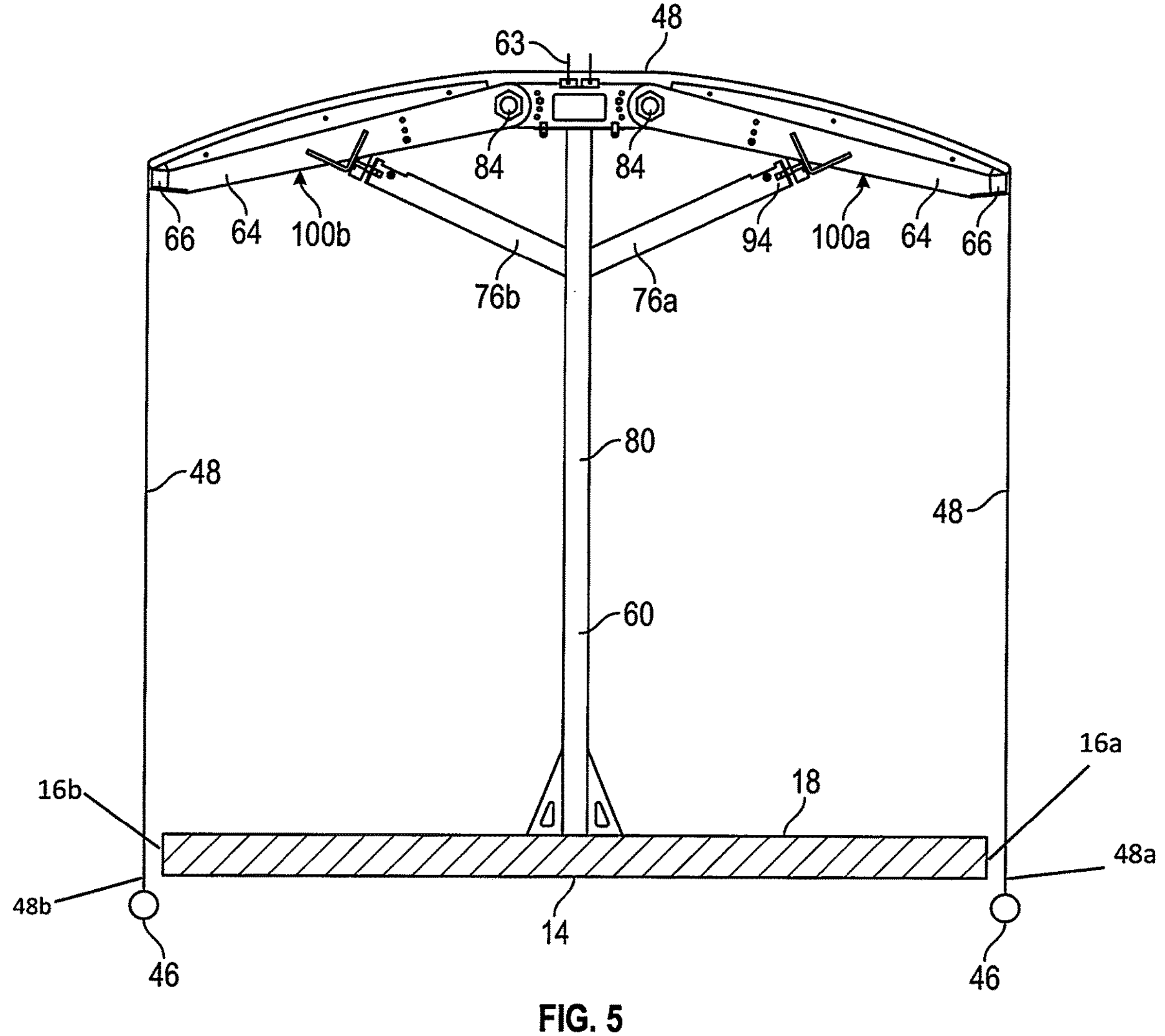
FIG. 5 illustrates schematically the vertical support post, and roof subframe assembly shown in FIG. 4, with the tarpaulin of the enclosure system fully deployed over the trailer bed.

FIGS. 3 to 5 show best enclosure frame assembly 50 as extending the longitudinal length of the trailer bed 18 between the front headboard assembly 42 and rear tailboard assembly 44. In the embodiment shown, the support frame 58 is used to movably mount each roof frame subassembly 100*a*, 100*b* in a symmetrically orientations about the longitudinal center axis $A_L$-$A_L$ of the trailer bed 14. The support frame 50 includes three longitudinally spaced, generally vertical support posts 60, connected by a central ridge beam 62 which extends from the headboard assembly 42 to the tailboard assembly 44, the longitudinal length of the trailer 10. Although FIG. 3 shows the support frame assembly 58 as having three support posts 60, it is to be appreciated that depending on the overall trailer length, fewer or greater numbers of support posts 60 could be provided.

Figure 6:
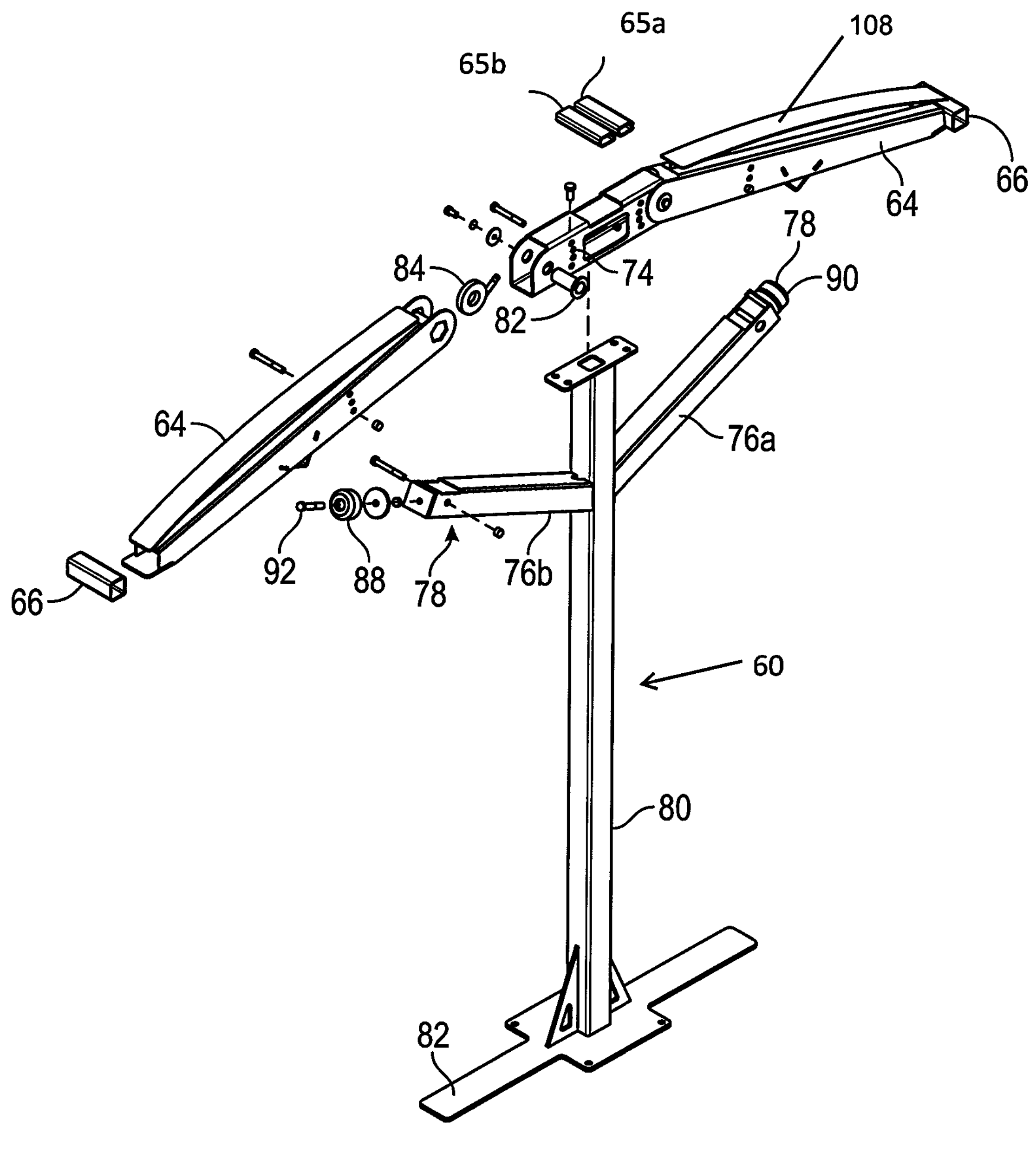
FIG. 6 shows a partial exploded view of the vertical support post, rafter support arms and edge purlins used in the roof subframe assemblies shown in FIG. 5.

The ridge beam 62 is preferably positioned over the longitudinal center of the bed surface 18 and is used to supportingly connect the upper ends of each support post 60. In one simplified construction, the ridge beam 62 is formed from a pair of generally horizontal parallel spaced square aluminum or steel tubes 65*a*, 65*b* (FIG. 6). The tubes 65*a*, 65*b* are fixedly secured to a top connecting bracket 74 which is mounted to the top of each vertical support post 60, as well as to apex portions of both the front headframe assembly 42 and rear tailboard assembly 44 by weldments or mechanical fasteners.

In one possible construction, the ridge beam 62 may function as a longitudinal anchor surface for the tarpaulin 48, with the tarpaulin 48 fixedly secured thereto along its longitudinal center by a series of screws, cleats or other mechanical fasteners 63. In other embodiments, the tarpaulin 48 may be provided in a free-floating arrangement over the ridge beam 62, and/or anchored at attachment points on the roof frame subassemblies 100*a*, 100*b*.

Each roof subframe assembly 100*a*, 100*b* is symmetrical disposed about the longitudinal center axis $A_L$-$A_L$ of the trailer 10. Each roof subframe assembly 100*a*, 100*b* is comprised of a series of parallel spaced pivotable rafter support arms 64 and a frame side purlin 66. The roof support arms 64 of each subframe assembly 100*a*, 100*b* extend laterally outwardly in opposed directions from an associated central post 60 from a respective inner proximal end 70 to an outermost distal end 72 and as will be described with an upper upwardly curving top-most surface.

Most preferably, the purlins 66 extend the longitudinal length of the trailer bed 18, spanning from the headboard assembly 42 to the tailboard assembly 44. The purlins 66 are preferably formed from square or round tubular aluminum or steel. The side purlins are fixedly secured to outermost distal ends 72 of each of the associated rafter support arms 64 of the roof frame section 100*a*, 100*b*, so as to align substantially vertically above the adjacent trailer bed side 16*a*, 16*b* and function as an upper horizontal edge support for the tarpaulin 48 when fully deployed over the trailer bed 18.

Each vertical support post 60 is shown best in FIGS. 4 to 6 as including generally Y-shaped strut arms 76*a*, 76*b*, and a vertically elongated central support 80. The central support 80 may be formed from square tubular aluminum or steel has a vertical height selected at between about 6 and 10 feet, preferably about 7 and 9 feet, depending on the desired overall height of the enclosure system 40 relative to the trailer bed 18. Optionally, a mounting plate 82 is secured to a lowermost end of the central support member 80. The mounting plate 82 is used to fixedly secure the central support 80 to the trailer bed surface 18 in the desired spacing and position.

The strut arms 76*a*, 76*b* extend laterally and preferably are formed with a mirror construction relative to the longitudinal center axis $A_L$-$A_L$ of the trailer bed 18. The strut arms 76*a*, 76*b* have an overall length and mounting position selected so as to be engageable with an underside of an associated rafter support arm 64 and provide for adjustability in the final orientation of each roof frame subassembly 100*a*, 100*b* when the tarpaulin 48 is deployed. In particular, the strut arms 76*a*, 76*b* are preferably configured to allow for simplified final adjustment in the horizontal positioning of each roof frame subassembly 100*a*, 100*b* as for example, may be necessary to allow for compensation for any stretching or shifting of the tarpaulin 48 with wear. Each strut arm 76*a*, 76*b* extends laterally outwardly and angularly upward from the central support member 80 at an angle of between about 110° to 135°, to a respective outermost upper end 78.

FIG. 6 illustrates best each strut arm 76*a*, 76*b* as including telescopic bumper 88 at each outermost end 78. In a simplified construction, the telescopic bumper 88 includes a rubber bung 90 mounted on a threaded rod 92. The rod 92 threadedly received in a complimentary threaded manner in a threaded socket provided in each arm 76*a*, 76*b*. Relative rotation of the threaded rod 92 in the socket allows for telescoping displacement of the bung 90, and the simplified adjustability of rafter support arm orientation 64 in the deployed position. Such adjustability may allow user to limit or permit increased lowered or downward pivotal downward movement of the rafter support arms 64 and edge purlin 66, depending on the final desired positioning of the roof subframe assemblies 100*a*, 100*b*.

Figure 7:
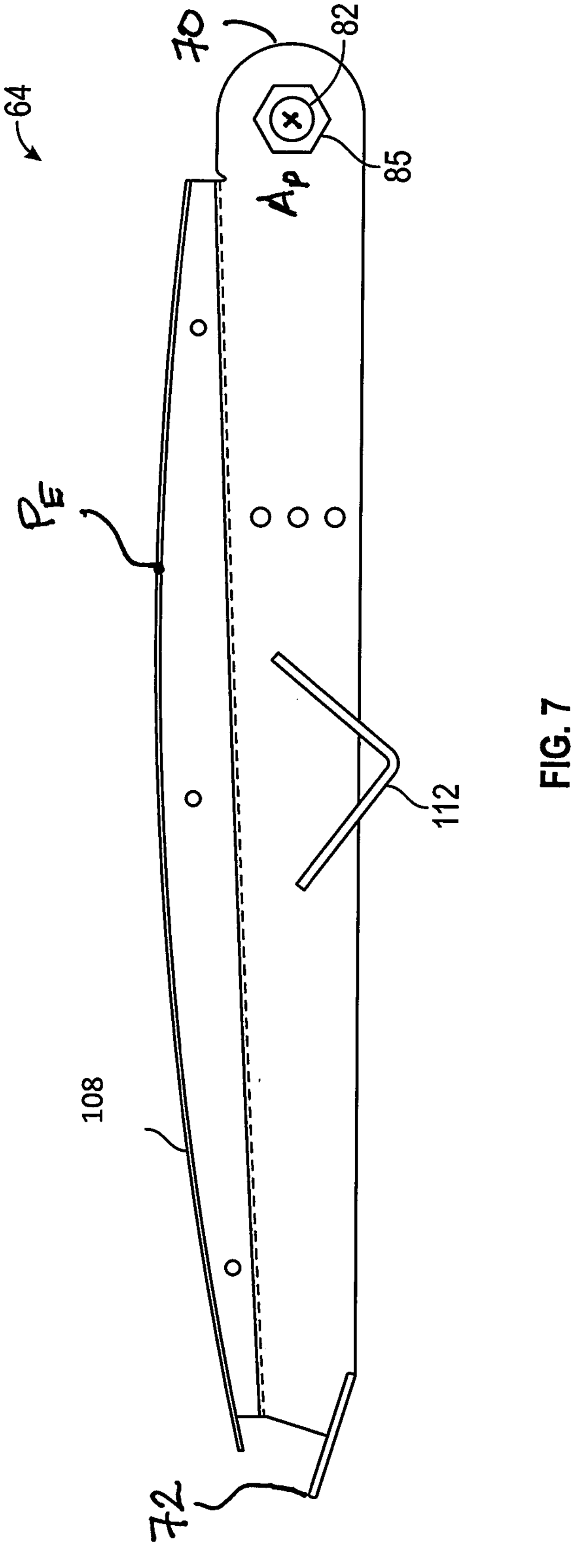
FIG. 7 illustrates an enlarged schematic view of a pivotable rafter support arm used in the roof subframe assemblies shown in FIG. 4.
Figure 12A:
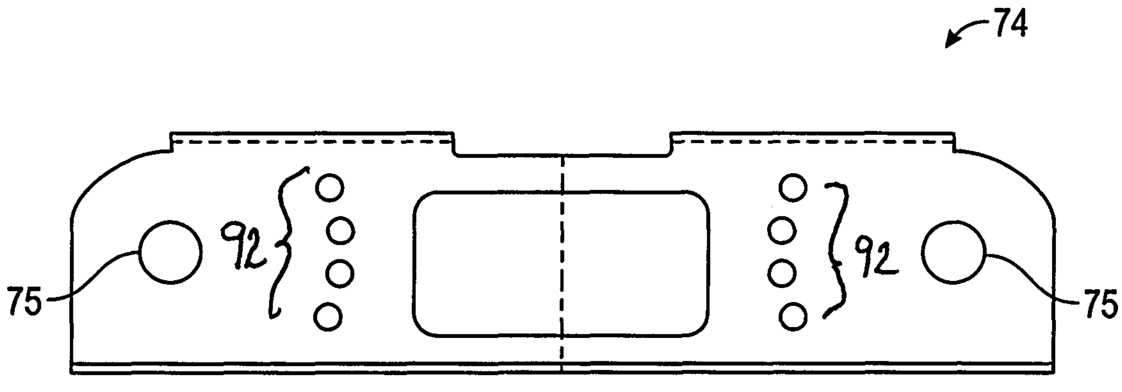
FIGS. 12A and 12B show schematically a mounting block used to pivotally secure the rafter support arms to the vertical support post shown in FIG. 3.
Figure 12B:
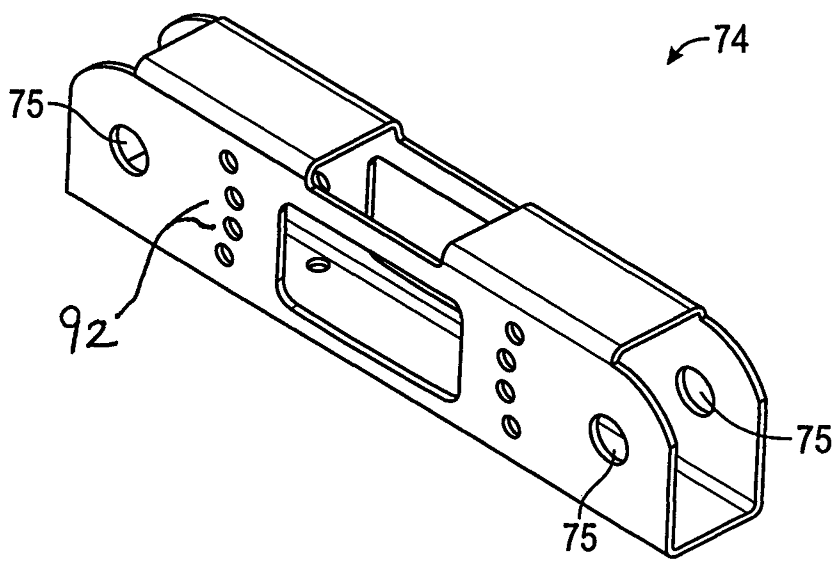

FIGS. 6, 12A and 12B show top bracket 74 used in hingely coupling the rafter support arms 64 to each support post 60. The connecting bracket 74 is preferably formed having a generally square channel-shaped body. The bracket 74 is secured to the topmost end of the central support 80 by suitable mechanical fasteners, or optionally by weldments. Pairs of aligned through-bores 75, spaced respectively towards each body end are adapted to receive a pivot pin 86 (FIG. 7).

Figure 8:
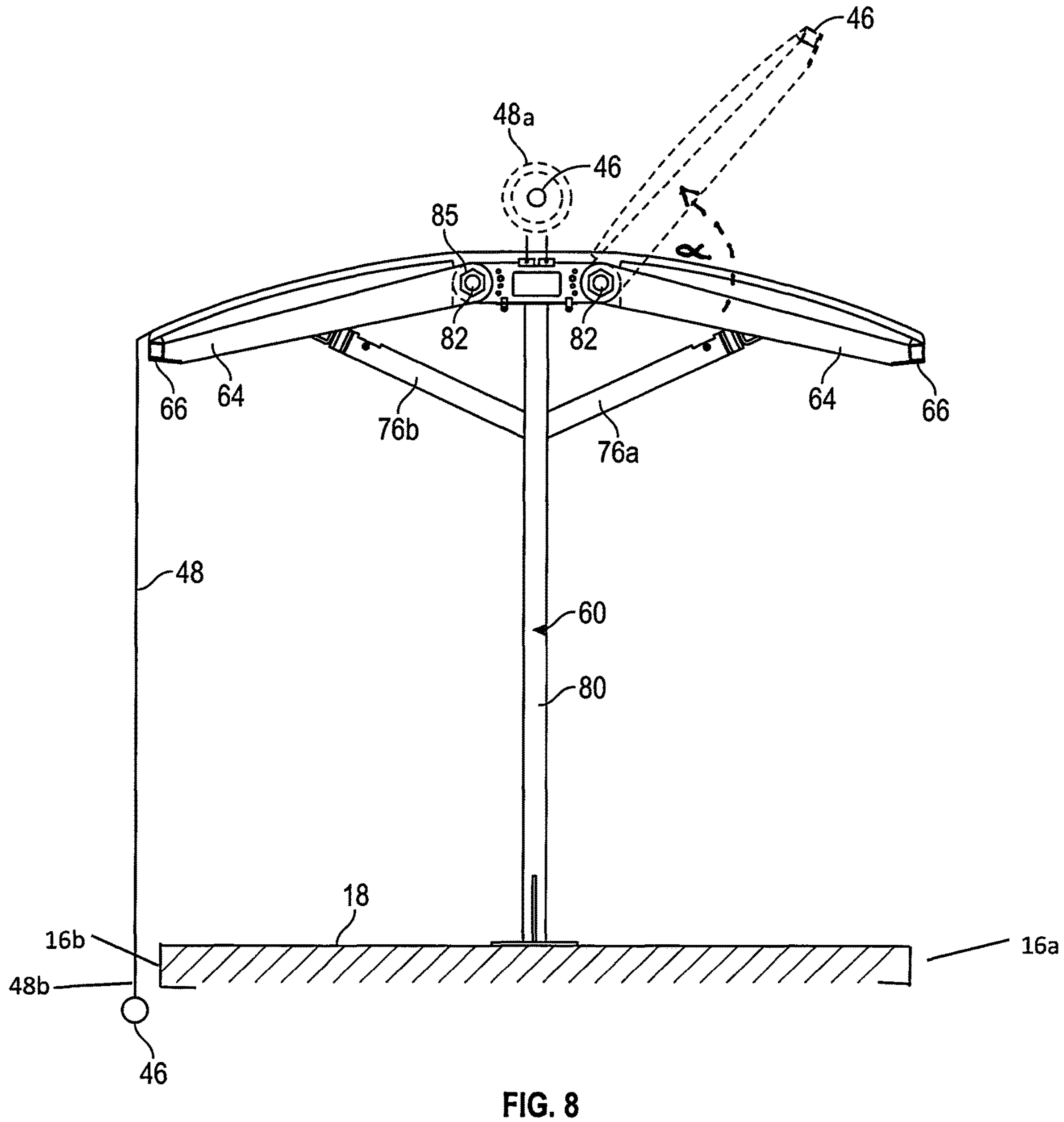
FIG. 8 illustrates schematically the pivotal movement of a rafter support arms between a lowered extended position, and a raised retracted position providing across to the trailer bed sides.

FIGS. 5 to 8 show the rafter support arms 64 and their mounting connections of the rafter support arms 64 of each opposing roof frame subassembly 100*a*, 100*b* is effected by hingely securing to the bracket 74 of each support post 60 by an associated pivot pin 82. The support arm 64 of each subframe assembly 100*a*, 100*b* is pivotable about the pin 82 so as to be hingely movable about a common pivot axis Ap-Ap between a generally horizontal, lowered deployed position and raised retracted position. Most preferably, in the raised retracted position, the distal end 72 of each rafter support arm 64 and purlin 66 is moved inclined upwardly at an inclined angle of between about 30° and 90°, and preferably between about 40° and 60°. As shown in FIG. 8, the rafter support arms 64 are thus rotatable about the pivot axis $A_p$-$A_p$ from a deployed or extended position show solid lines, where the arms 64 are rotated downwardly and into bearing contact with the underlying strut arm 76*a*, 76*b* and the side purlin 66 is supported at forward and rearward ends by the first headboard and rear tailboard assemblies 42, 44; and a raised position shown in phantom, with the distal most arm ends 72 are moved upwardly. In this manner, the rafter arms 64 along each longitudinal side of the support posts 60, and the associated side frame purlin 66 pivot together as a movable unit between a lowered extended position and the retracted or raised position, as a unitary roof support panel.

A lift assembly 110 is used to resiliently bias the rafter support arms 64 in pivotal movement about the pivot axis $A_p$-$A_p$ to the raised or retracted position. The lift assembly 110 includes at least one, and preferably a number of torsion coil springs 86, each associated with a respective rafter support arm 64. Preferably, a user actuable threaded tensioning screw 85 for each torsion spring 84. The tensioning screw 85 is selectively rotatable by a user to selectively increase or decrease the spring force applied by the torsion spring 84 on the associated rafter support arm 64. In another non-limiting construction, the top bracket 74 may be provided with one or more arrays of positioning holes 92. The positioning holes are adapted to receive a removable locating pin 94 used to selectively engage and secure an end of the torsion spring 84 under different degrees of tension. The torsion springs 84 operate to resiliently bias the rafter support arms 64 and side purlin 66 of each associated roof subframe assembly 100*a*, 100*b* to the raised retracted position under downward load forces selected less than a predetermined threshold force. As shown schematically in FIG. 8, in a most simplified embodiment as the coiled tarpaulin edge portion 48*a* moves over and laterally inwardly past the support arms 64, the torsion springs 84 pivot the support arms 64 upwardly at an angle $\alpha$ of 30° to 90°, preferably at about 40° and 60°, and most preferably about 45° to 65°.

Preferably, the threshold force required to overcome the upward biasing force of the lift assembly 11 is selected as the rotational downward torque force applied by the weight of the spindle 44 and coiled edge portion of the tarpaulin 48 on the rafter support arms 64 when the spindle 46 and coiled tarpaulin edge portion 48, connected thereto is moved laterally outward against the rafter support arms 64 to an actuation point. The actuation point is selected a distance from the pivot axis $A_p$-$A_p$ as the force equivalent point $P_E$ where the upward biasing force applied by the lift assembly 110 equals the downward force applied by the weight of the spindle 46 and coiled tarpaulin edge 48. Most preferably, the distance is the distance about 30% to about 70%, and most preferably about 40 to 60% along overall lateral length of the rafter support arm 64.

It is to be appreciated that with the present invention, the manual adjustment of the lift assembly 110 by a user, allows for the selective variations in the positioning of the force equivalent point PE relative to the pivot axis $A_p$-$A_p$. The lift assembly 110 may be used to selectively control the degree of tarp coiling or uncoiling about the spindle 46, and the winding position of the tarp relative to the enclosure frame assembly 50 required for deployment or retraction of each roof substrate assembly 100*a*, 100*b*.

Figure 9:
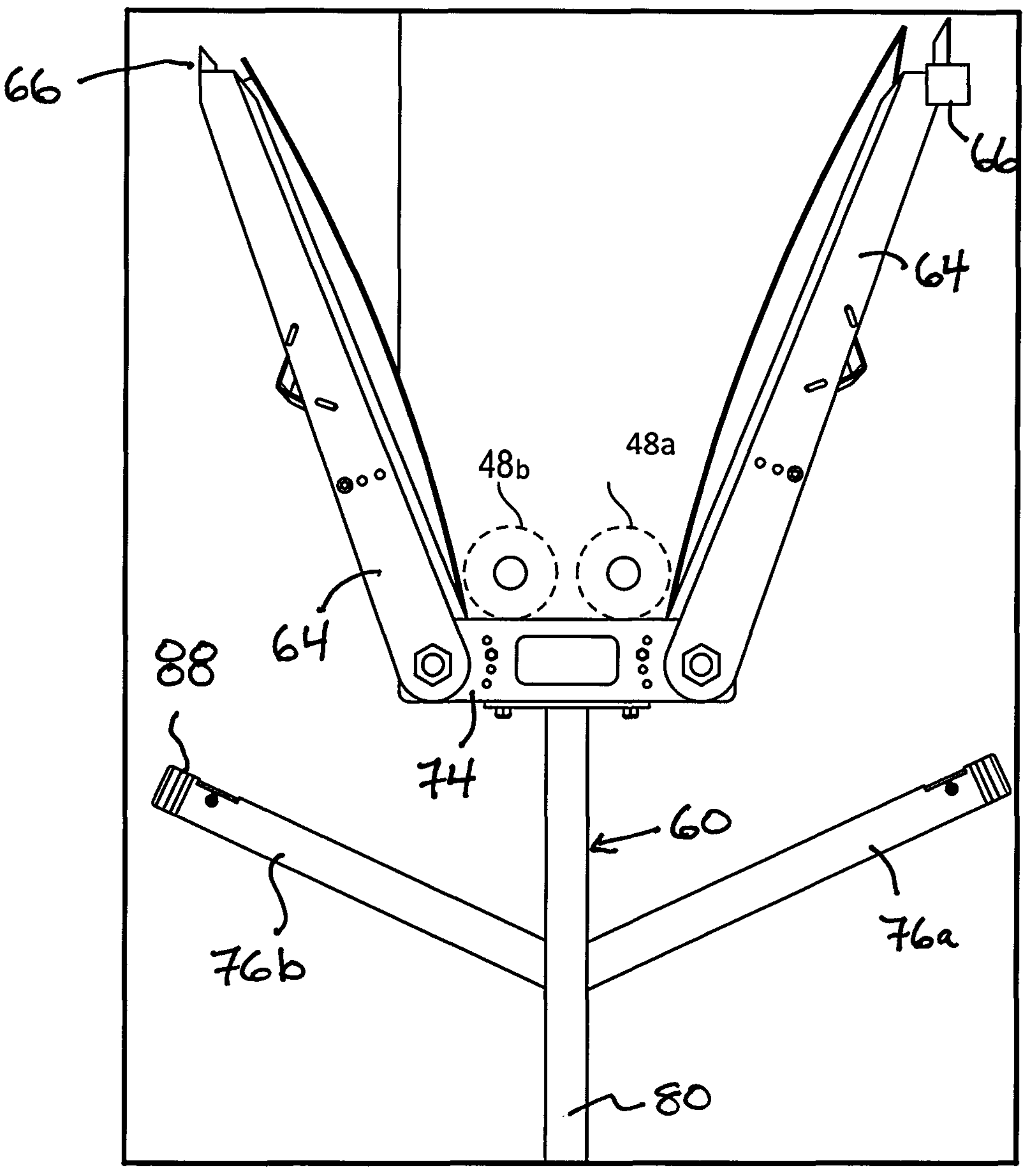
FIG. 9 illustrates the pivoted movement of opposed pairs rafter support arm to a fully raised, retracted position in the retraction of the roof support frame for dual side trailer loading and unloading.

As the rafter support arms 64 pivot downwardly, the arms 64 are moved into bearing contact against the bung 90 at the outward-most end 78 of each strut arm 76 so as to be supported thereby. Preferably in the deployed position, the side purlins 66 are each aligned directly over each longitudinal trailer bed side 16*a*, 16*b*, and form upper lateral edge supports of the enclosure frame assembly 50. In the retracted or raised position, the rafter support arms 64 are rotated about the associated pivot pin 88 to a raised position. In the raised position, the distal outer end of the rafter support arm 64 and the associated purlin member 66 pivots vertically upward relative to the bed 18 and laterally towards the axis the $A_L$-$A_L$, with each roof subframe assembly 100 moving as an integral unit. In one possible embodiment, each subframe assembly 100*a*, 100*b* is configured to be resiliently biased to the raised, retracted position by the torsion springs 84 as a coiled edge of the tarpaulin 48 and winding spindle 46 is wound and moves laterally inwardly past each support arm 64 to a position directly over the connecting bracket 74, as shown in phantom in FIG. 9. In an alternative embodiment, the lift assembly 110 may be configured whereby the force equivalent point $P_E$ is located along the rafter support arms 64 spaced distally from the pivot axis $A_p$-$A_p$, and when in the retracted orientation, the spindle 46 and tarpaulin coiled edge portion 48 are pivoted upwardly in movement together with the roof frame sub assembly 100.

Optionally, one or more longitudinal adjacent rafter support arms 64 may be connected by one or more longitudinally extending rigid or flexible roof sheeting panels to provide each subframe assembly 100*a*, 100*b* with additional structural support.

Although not essential, most preferably when each subframe assembly 100*a*, 100*b* is moved to the extended position, the longitudinal ends of each side frame purlin 66 are brought into supporting contact with complementary recesses or saddles 118, 120 respectively formed in the upper edge portions of the front headboard assembly 42 and rear tailboard assembly 44. Alternatively, one or more additional vertical supports (not shown), may be provided adjacent to each of the front and rear trailer bed ends 32, 34 for independently supporting the ends of each side purlin 66. Additional support posts 60 may also be mounted inside and adjacent to the front headboard assembly 42 and tailboard assembly 44 as providing added support to the roof frame assembly 50.

FIG. 7 illustrates best each rafter support arm 64 as having a curved upper surface 108, and a lower stop brace 112. When the rafter support arm 64 is fully extended, the upper surface 108 curves laterally in an upwardly and outwardly downward arc with the stop brace 112 in engaged contact with an associated strut arm end 78. The applicant has appreciated that as the coiled edge portion 48 is wound about the spindle 46 and moves laterally inwardly past the purlins 66, the curved upper surface 108 of the rafter support arms 64 may allow for a further vertical displacement of the spindle 46 and coiled tarp edge 48 thereon above the trailer bed 18, providing increased clearance. The curved upper surface 108 further allows for an increased downward slope as the tarp 48 is uncoiled from the retracted position to the covering extended position, facilitating uncoiling and tarpaulin deployment. Although not essential, the curved upper surface 108 preferably extends outwardly at least partially above the side frame purlin 66, to facilitate the rolling and unrolling movement of the tarp 48 therepast.

Although FIG. 6 illustrates the lift assembly 110 as including torsion spring 84 used to bias each roof frame assembly 100*a*, 100*b* in upward movement, the invention is not so limited. Gas struts, hydraulic actuator or other biasing elements may be provided which are adapted to effect upward pivotal movement of the subframe assembly 100*a*, 100*b*.

Figure 10:
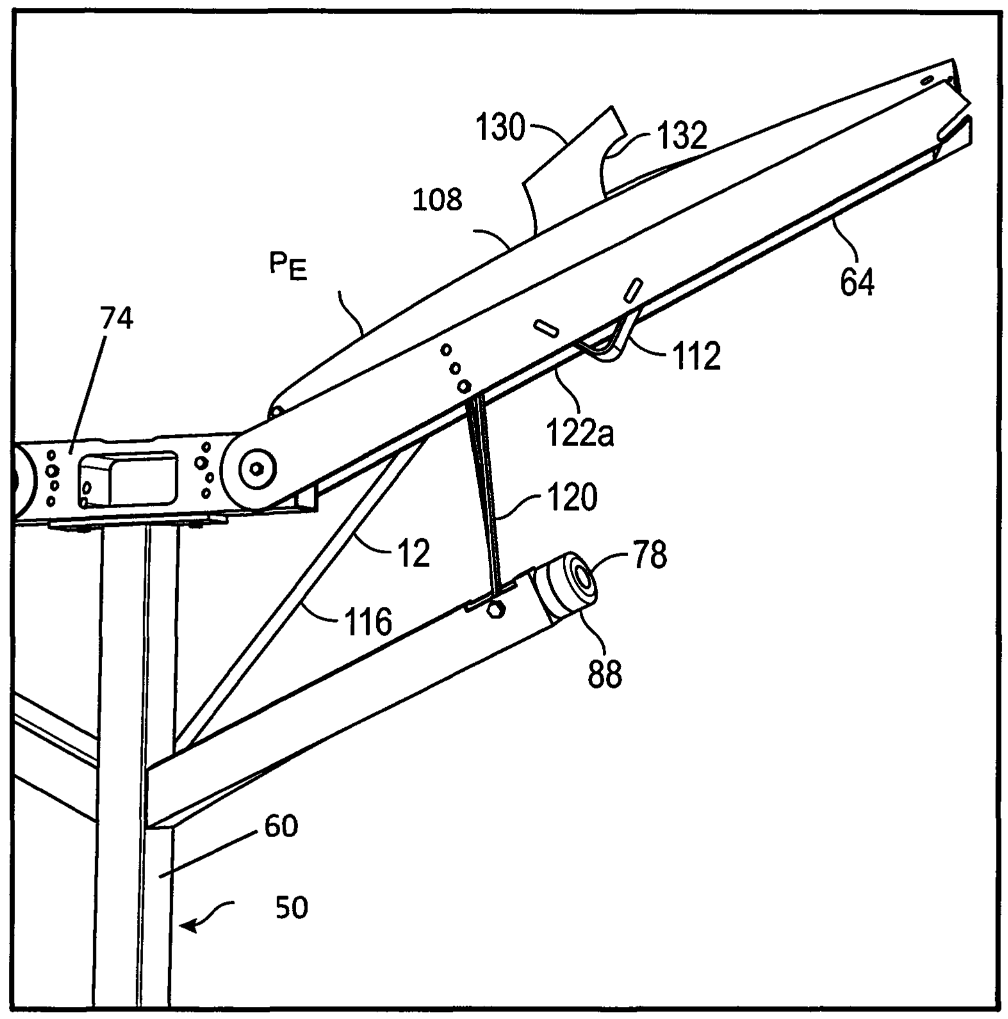
FIGS. 10 and 11 illustrate a pneumatic piston and positioning limiter used to control upward pivoting movement of rafter support arms in accordance with a further embodiment of the invention.
Figure 11:
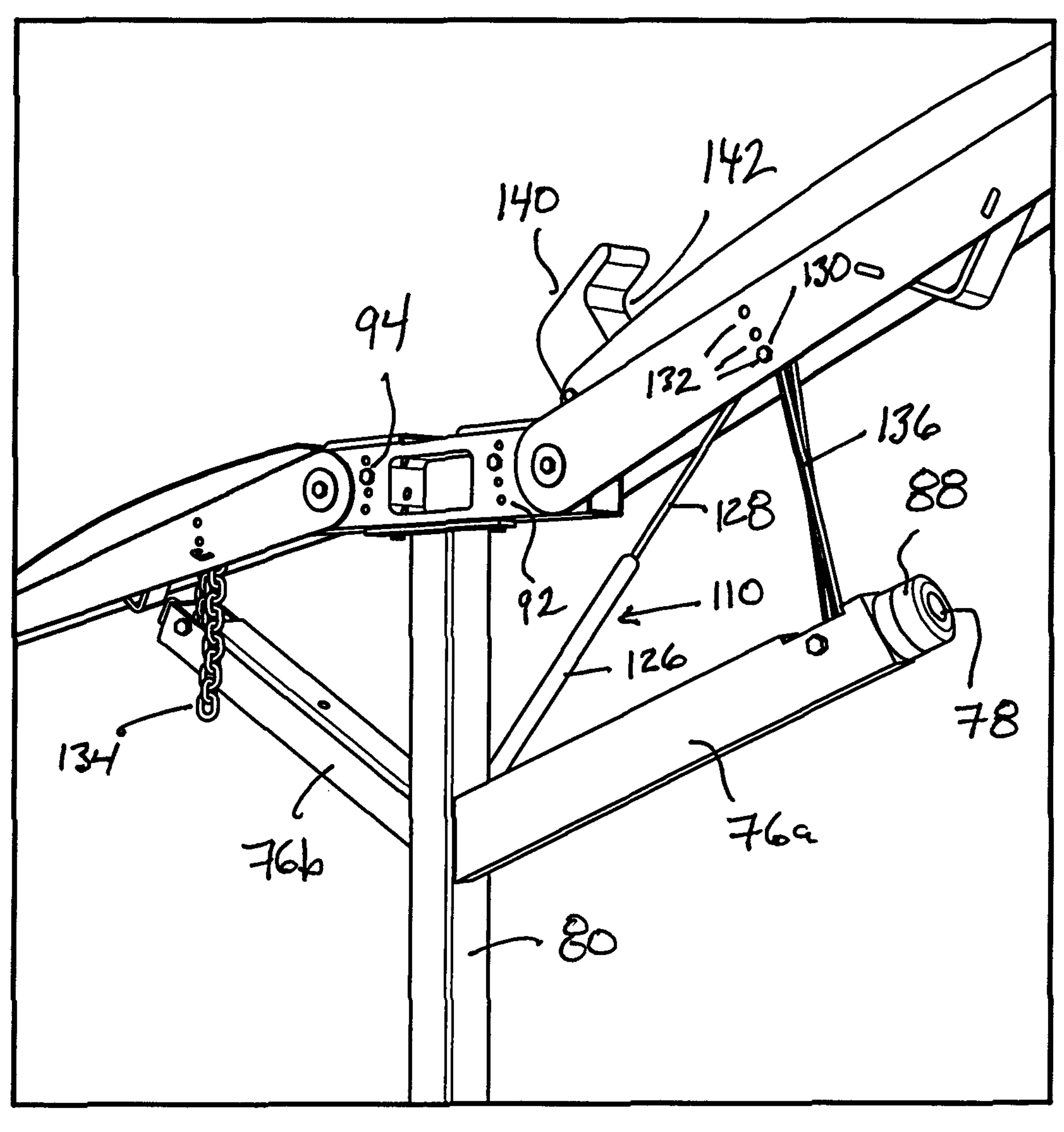

Reference may be made to FIGS. 10 and 11 which illustrate the resilient biasing and position limiting of the rafter support arms 64 in accordance with an alternative embodiment, and wherein like reference numerals are used to identify similar components. In the construction shown, each lift assembly 110 is provided with gas struts 126 to resiliently bias the rafter support arm 64 to the raised position. The gas struts 126 include a telescoping gas strut arm 128 which is hingely secured at a lower end to the vertical support 60, and which includes an end portion adapted for coupling to an of the rafter arm 64 by an associated rafter support cotter pin or anchor bolt 130. Preferably, a series of positioning holes 132 are formed in the rafter support arm 64 for receiving the anchor bolt 130. The positioning holes 132 are provided to allow for the selective securement of the strut arm 128 of different locations.

With the illustrated arrangement that the selected positioning of the end or the arm 128 by the anchor bolt 130, may be used to both limiting upward pivotal movement of the rafter support arm 64, and/or vary the biasing force provided by the strut 126. Advantageously this may allow user adjustability in the biasing force provided by the gas strut 126.

In the embodiment shown, the telescoping gas strut 126 is used to resiliently bias the connected rafter support arm 64 and the associated roof subframe assembly 100*a*, 100*b* to the raised retracted position. The gas struts 126 are further preferably selected to allow for controlled movement of the rafter support arm 64 to the retracted position together with the purlin 66. The gas struts 126 may act in conjunction with other biasing elements to provide a resilient biasing force which is selected such that the unwinding of the coiled tarpaulin edge portion movement of the spindle 46 as the tarpaulin 48 is uncoiled and deployed provides a sufficient downward force to effect repositioning and lowering of the rafter support arms 64 and the associated side purlin 66 against the biasing force of the struts 126 to the lowered extended position shown in FIG. 2.

FIG. 11 further shows the enclosure system as including either a tether chain 134 or strap 136. The tether chain/strap 134, 136 is used to limit the degree of angular upward pivotal movement of the rafter support arm 64 about the pivot axis $A_p$-$A_p$ to less than 90° and preferably to an angle selected at between about 35° and 70° preferably about 40° and 60°. Although not essential, in a simplified construction, the positioning holes 132 may function as anchor points for the chain/strap 134, 136. The positioning holes 132 chosen to allow the selective positioning of an anchor bolt 130 used to secure an end of the chain/strap 134, 136 in addition to the strut arm end 128. By selectively positioning the anchor bolt 130 in a desired positioning hole 132, customization of the degree of pivoting movement of the rafter support arm 64 may be readily controlled. By the connection of the chain and/or tether strap 134, 136 to a particular positioning hole 132, the customer may fine tune a desired stop positions for the subframe assembly 100*a*, 100*b*. It is to be appreciated that by varying the connection point between the extendable arm 126 and a particular positioning hole 132, the resilient biasing force on the rafter support arms 64 may also be varied, allowing for greater user customization.

As described, each rafter support arm 64 preferably is provided with an upper surface 108 which has a built-in curvature. In a retracted position allows for greater displacement height of the overlying tarp and access during loading and unloading. The inventor has recognized that certain jurisdictions regulate the legal limit in which a tarpaulin system may retract, so as to not become an overhead hazard. The applicant has appreciated that by providing positioning holes 132 which provide multiple attachment anchor points, the trailer enclosure system 40 may be easily and readily customized to a particular user's need and/or regulatory environment. It is envisioned that positioning holes may be used in conjunction with conventional bolts or other quick release fasteners to provide an infinite number of potential stop positions oriented at between −15° to +70° relative to horizontal. While FIGS. 10 and 11 illustrate the rafter support arm 64 as including a series of positioning holes 132 the invention is not so limited. Fewer or greater numbers of positioning holes adapted to receive and position anchor bolts 130 or other fasteners used in the securement of the chain tether chain/strap 134, 136 and/or strut arm 128 may also be provided. Most preferably, by positioning of the anchor bolt 130, the freedom of pivotal movement of the support arm may be selectively limited. In non-limiting embodiments, the degree of freedom may be regulated at preselected movement such as 70°, 75°, 80°. Alternatively, a fully adjustable anchoring arrangement may be adapted to allow for variable degrees of adjustment to control height at up to 90°. The applicant has appreciated that in certain jurisdictions, where regulations prevent trailer roofing systems from exceeding 13 feet, 6 inches in height, the present invention allows greater adjustability of the subframe assemblies 100*a*, 100*b* height in both deployed and retracted positions.

While the embodiment of the invention shown in FIGS. 10 and 11 describes the tarp enclosure system 40 as incorporating a series of gas struts 126 used to resiliently bias each of the rafter support arms 64 to the raised position, in an alternate configuration, the rafter support arms 64 may be biased in movement by other pneumatic or hydraulic actuators, as well as by the use of extension or torsion springs.

FIG. 11 illustrates the rafter support arm 64 as furthermore including an adjustable coiled tarp stop 140. The coiled tarp stop 140 is selectively positionable along the length of the arcuate upper surface 108 by the use of bolts or other mechanical fasteners. Alternatively, the stop 140 may be mounted as part of the headboard assembly 42 and/or tailboard assembly 44. The coiled tarp stop 140 may be retractable and is preferably used as an physical barrier to limit inward movement of the spindle 46 and coiled edge portion 48 to the rafter support arm 64. The coiled tarp stop 140 is configured to be engageable by the coiled edge portion 48 as it is wound laterally and retracted across the subframe assembly 100 towards the longitudinal center axis $A_L$-$A_L$, of the trailer bed 18. The stop 130 may be provided with a curved inner surface which forms a laterally outward directed bite 142 sized to receive at least part of the spindle coiled tarp edge 48*a* in a nested orientation therein. It is to be appreciated that by its engagement with the stop 130, the coiled tarp edge 48*a* and spindle 46 are advantageously raised together with subframe assembly 100 as the tarpaulin 48 is moved to the retracted position.

Figure 13:
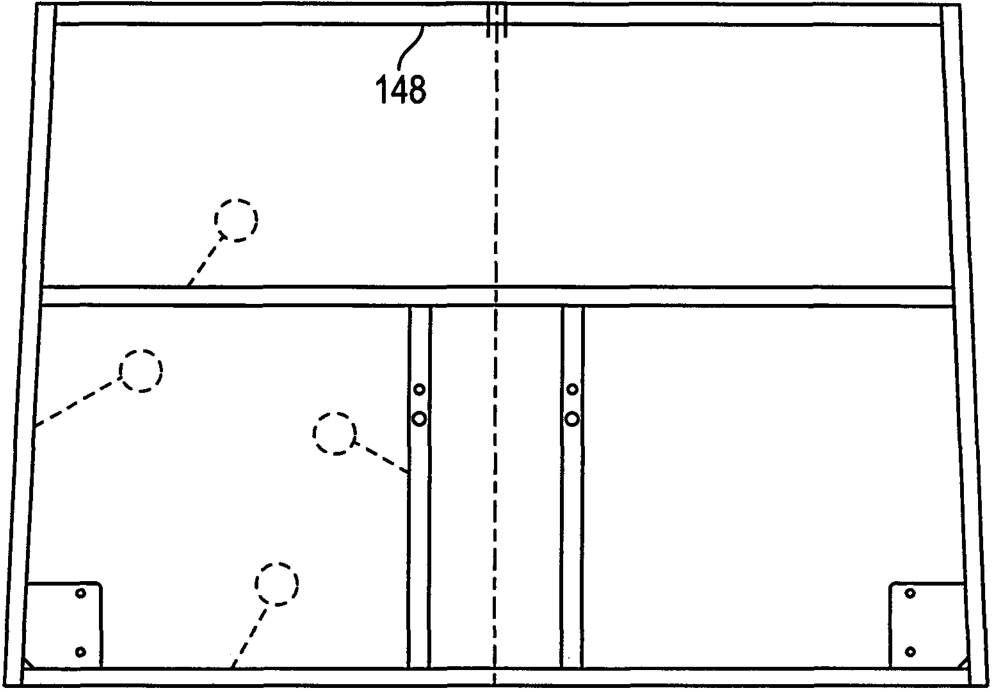
FIGS. 13 and 14 illustrate schematically a headache rack and front panel used in the front headboard assembly of the trailer enclosure shown in FIG. 2.
Figure 14:
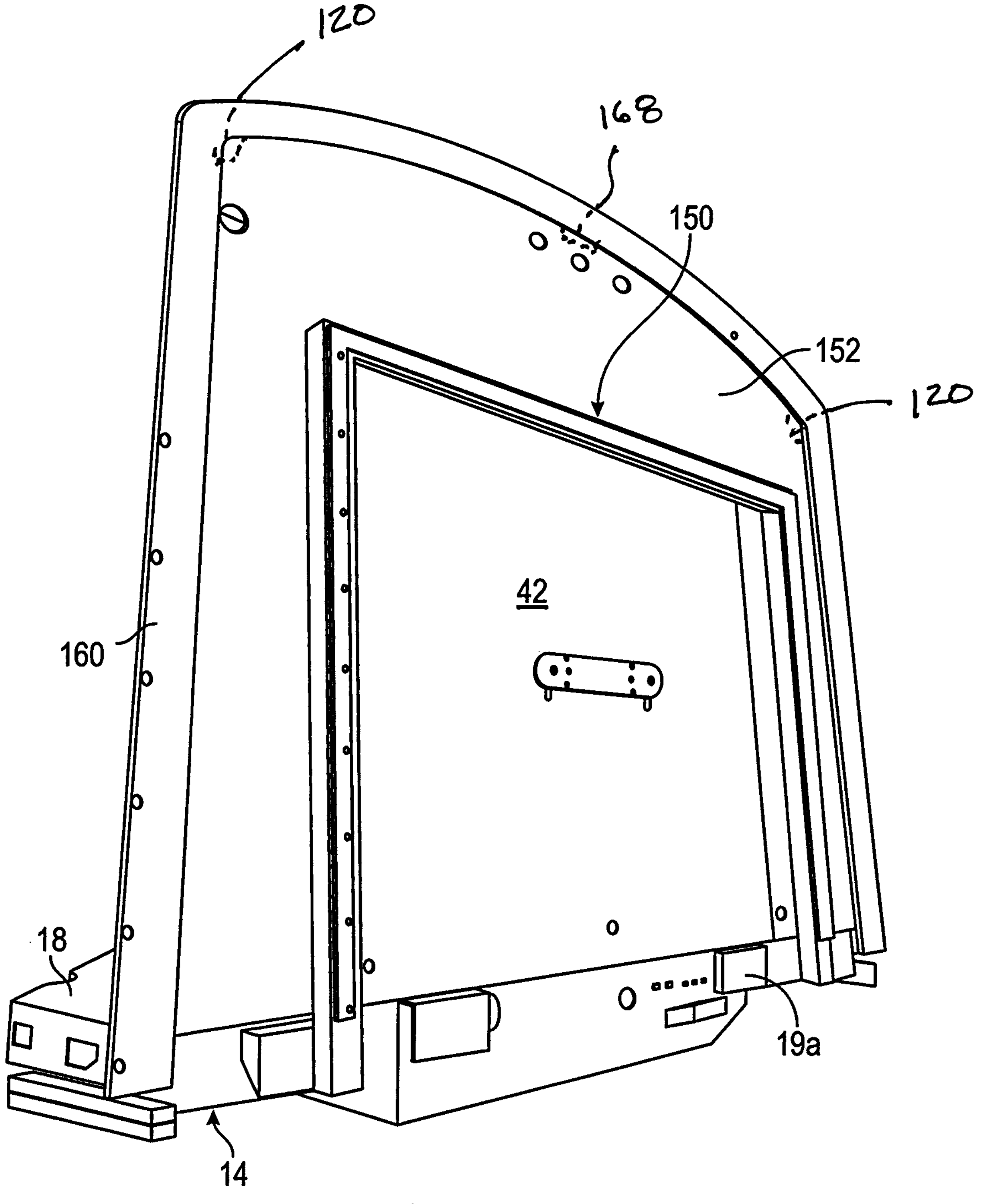
Figure 15:
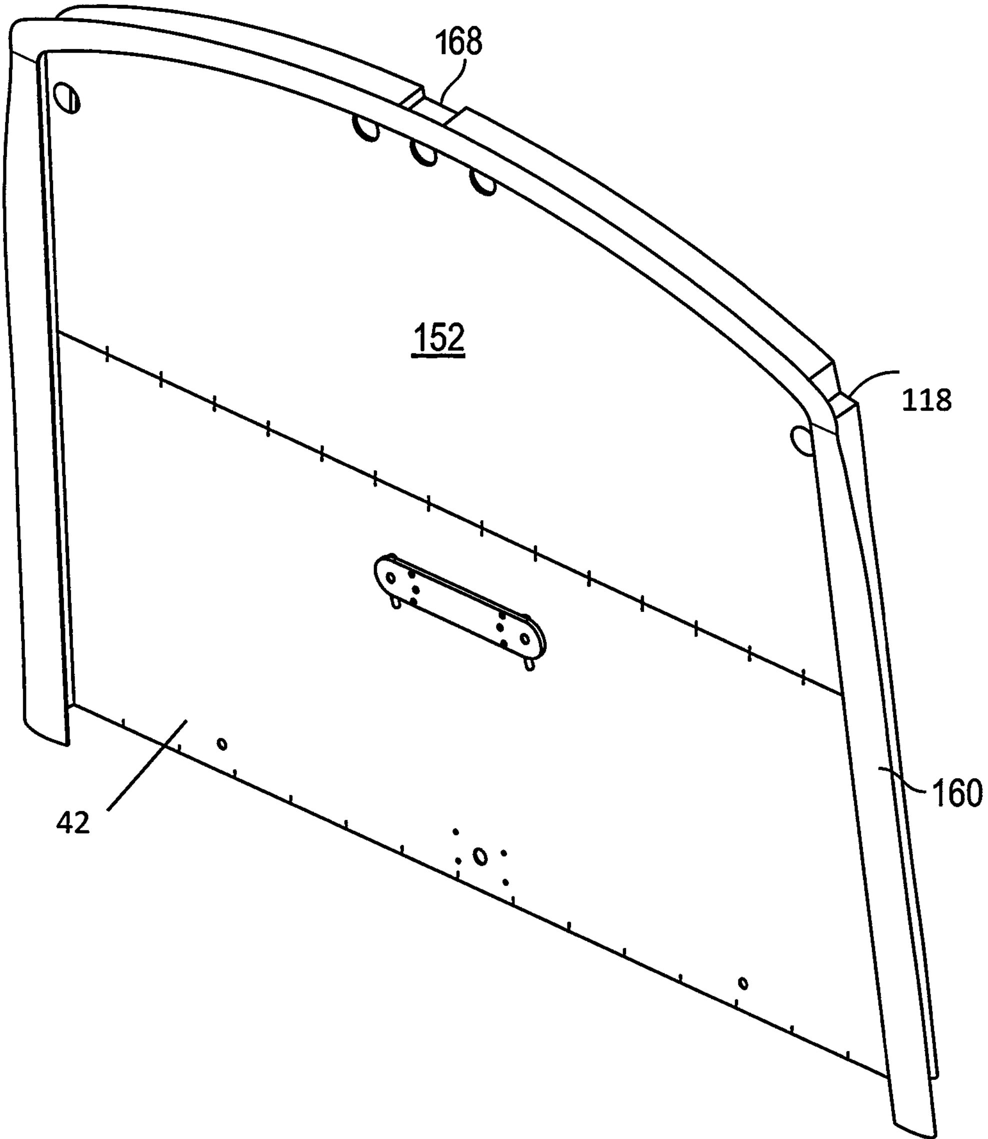
FIG. 15 illustrates a perspective view of the front panel shown in FIG. 14.

FIGS. 13 to 15 illustrate best a preferred embodiment of a headboard frame 148, headache rack 150 and front headboard panel 152 used in the front headboard assembly 42. The headboard frame 148 is used to provide structural support to the pivot rods 24*a*, 24*b* in pivotal movement as coiled edge portions 48*a*, 48*b* of the tarp 48 are wound and unwound. The headache rack 150 is preferably positioned on a forward side of the front headboard panel 152, and with the headboard frame 148 rearward thereof. Most preferably, the front headboard panel 152 includes along its foremost side and top edges, an outwardly peripherally extending air deflector flange 160. In particular, the air deflector flange 160 preferably extends laterally beyond the remainder of the headboard panel 152 a lateral distance of between about one and three inches. Although not essential, most preferably the air flange 160 is mounted 0.5 to 2 inches, and preferably about 1 inch forwardly from the front surface of the panel 152. In a simplified construction, the air deflecting flange 160 is bolted or screwed to the remainder of the headboard panel 152 and acts as a wind deflector to limit or prevent air from blowing under the deployed tarp 48 at higher vehicle speeds, and preferably at vehicle speed selected greater than about 40 mph.

Figure 16:
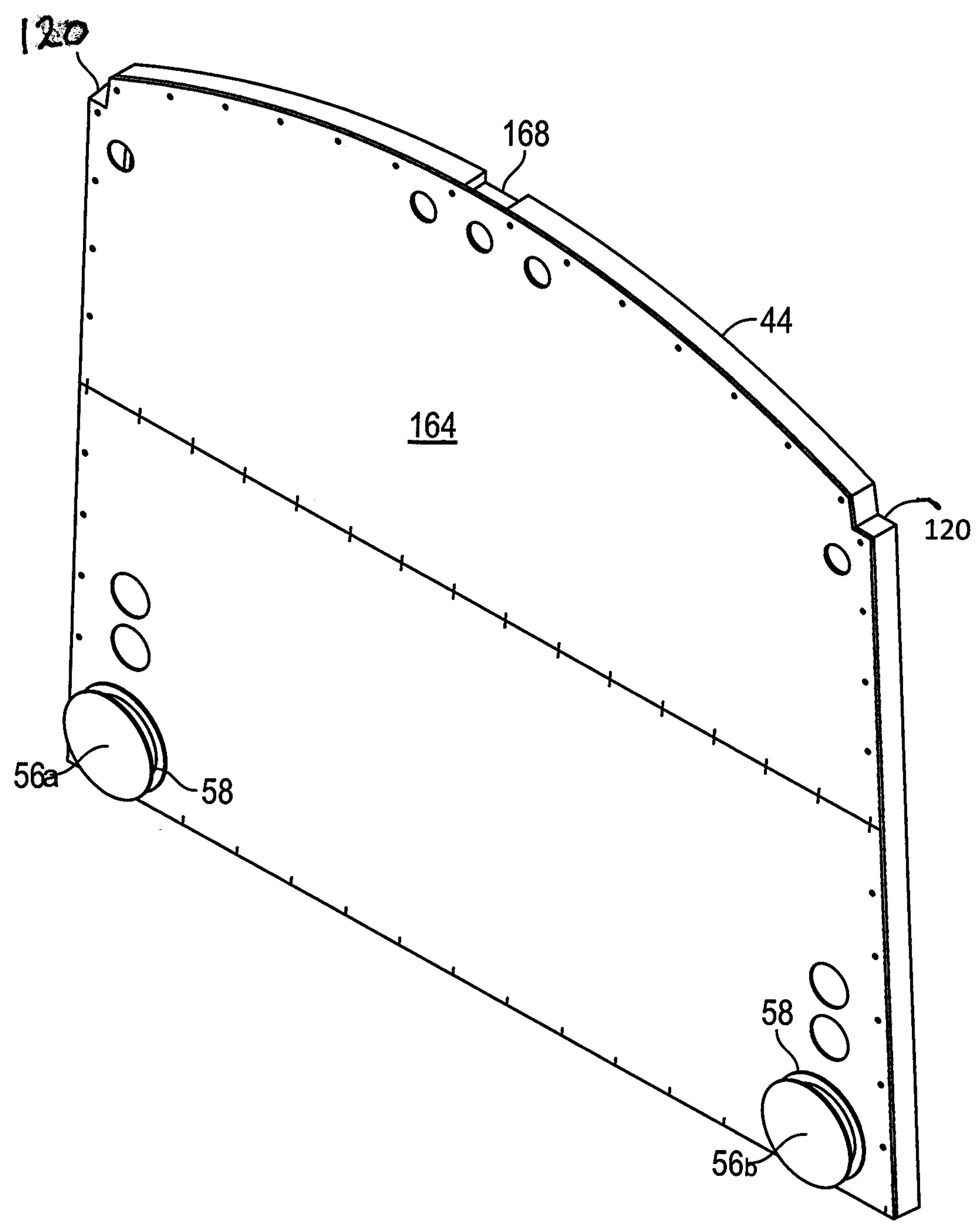
FIG. 16 illustrates schematically a rear tailboard assembly for use with the trailer enclosure system in accordance with the trailer enclosure shown in FIG. 2.

FIG. 16 shows best the rear tailboard panel 164 used in the rear tailboard assembly 44. The rear tailboard panel mounts adjacent each lateral lower edge a recoil tensioner 56*a*, 56*b*. Each recoil tensioner 56*a*, 56*b* is spring loaded and includes a retractable tether strap 58 which is provided in connection with an associated winding spindle 46 to assist in its guidance and/or movement as the tarpaulin 48 is retracted or extended. The recoil tensioners 56*a*, 56*b* are preferably configured to assist in maintaining a winding tension on the tarp 48 as the edge portions are uncoiled and coiled about the winding spindle.

As shown best in FIGS. 15 and 16, both the headboard panel 152 and tailboard panel 164 are preferably provided with both central and shoulder saddles 118, 120, 168 which are respectively adapted to supportably receive therein the ridge beam 62 and purlins 66 when the subframe assemblies 100*a*, 100*b* are deployed with the tarpaulin 48 covering the trailer bed 18.

I claim:

1. A trailer enclosure system for selectively covering a trailer bed surface comprising, a flexible tarpaulin for covering a selected portion of said bed surface, a support frame including a support assembly and a roof frame section, for selectively supporting said tarpaulin between an extended position, wherein said tarpaulin extends substantially over said selected portion, and a retracted position, wherein at least part of said tarpaulin is retracted to allow access to said selected portion to facilitate loading or unloading thereon, the support assembly configured for mounting the roof frame section spaced a vertical distance above said selected portion, the roof frame section including, at least two generally parallel spaced elongated rafter support arms, the rafter support arms extending from a first end to a second end, each rafter support arm being pivotally secured to the support assembly towards the first end for movement about a pivot axis between a deployed position, wherein said rafter support arms extend in a generally horizontal orientation over said portion of said bed surface, and a retracted position, wherein said rafter support arms extend angularly upwardly at an inclined angle of between about 15° and 90°, and an elongated purlin fixedly coupled to the second ends of the support arms for movement therewith, an elongated spindle coupled to an edge portion of the tarpaulin and being supported for movement in a substantially horizontal orientation, a drive for selectively journaling the spindle in rotational movement, wherein rotation of the spindle by the drive winds or unwinds the tarpaulin about the spindle to retract or extend the tarpaulin over said portion of the bed surface.

2. The enclosure system as claimed in claim 1 further including a lift assembly selected to resiliently bias at least one rafter support arm to said retracted position under downward forces selected less than a predetermined threshold force, and wherein the predetermined threshold force is selected as a downward rotational torque force applied by a combined weight of the spindle and edge portion of the tarpaulin to said associated rafter support arm at a force equivalent point spaced from said pivot.

3. The enclosure system as claimed in claim 2, wherein the lift assembly is a user adjustable life assembly and comprises a torsion spring configured to translate a resilient biasing force to a contact point of said associates rafter support arm, and an adjustment mechanism operable to selectively vary the resilient biasing force, the adjustment member comprises an adjustable torsion spring tensioning clamp.

4. The enclosure system as claimed in claim 3, further including a headboard panel disposed towards a forwardmost end of said trailer bed, at least one pivot rod rotatably supporting a forward end of the spindle mounted for pivotal movement relative to said headboard pane, and a wind deflector flange projecting laterally from side edges and top positions of said headboard panel a distance selected to limit air flow between the headboard and the tarpaulin when vehicle deployed at vehicle speeds greater than about 40 mph.

5. The trailer enclosure systems as claimed in claim 1, wherein said force equivalent point is spaced from said pivot axis by a distance selected at between about 40% and about 70% of the length of the rafter support arm.

6. The trailer enclosure system as claimed in claim 5, wherein the lift assembly comprises at least one or more of a torsion spring, a compression spring, a gas strut, a pneumatic strut and combinations thereof.

7. The trailer enclosure system as claimed in claim 6, wherein each said rafter support arm includes a generally upwardly arcuate uppermost surface.

8. The trailer enclosure system as claimed in claim 1, wherein in said deployed position, the second ends of the rafter support arms and purlin are moved to a position substantially vertically over and above a longitudinal edge side of said trailer bed surface, and in said retracted position, the second ends of the rafter support arms and purlin are raised vertically about 20 cm to about 60 cm spaced from the deployed position.

9. The trailer enclosure system as claimed in claim 1, wherein the support assembly includes at least one arm mount spaced vertically a distance above said bed surface, a respective rafter support arm being coupled to the arm mount by an associated pivot pin.

10. The trailer enclosure system as claimed in claim 9, wherein the support assembly further comprises at least one substantially vertical support post mounted to and extending from a longitudinally central portion of said bed surface, the arm mount being secured towards an upper end portion of the support post.

11. The trailer enclosure system as claimed in claim 10, further including a brace arm associated with each said support post, the brace arm extending from a lower end coupled to said support post, to an uppermost outward end, the uppermost outward end being positioned to engagingly support an underside of the respective rafter support arm in said deployed position, and wherein the outward end further includes a vertically positionable end member.

12. The trailer enclosure system as claimed in claim 11, wherein the trailer bed surface comprises a horizontal support surface of a generally rectangular truck trailer flat bed.

13. An enclosure system for a trailer bed surface comprising, a flexible tarpaulin for selectively covering a top, a support frame for supporting said tarpaulin between an extended position, wherein said tarpaulin extends substantially over said bed surface, and a retracted position, wherein at least a longitudinal edge portion of said tarpaulin is retracted to a position spaced vertically above said trailer bed to facilitate loading or unloading thereon, the support frame including a laterally extending roof frame section and a support assembly configured for mounting the roof frame section spaced a vertical distance above said trailer bed, the roof frame section including, a pair of generally parallel spaced elongated rafter support arms, the rafter support arms extending from a first inner end spaced towards said support arm to a second outer end, and a rigid purlin member spanning between and coupled to each rafter support arm second end, each rafter support arm being mounted for movement about a pivot axis between a lowered deployed position, wherein said rafter support arms extend laterally over at least part of the top of said bed surface and said purlin member orients substantially above one said trailer bed side, and a raised position, wherein said outer ends of said rafter support arms are inclined angularly upwardly from horizontal at an angle of between about 15° and 90°, and said purlin member is moved laterally inwardly over said top of said trailer bed, a lift assembly configured to resiliently bias the rafter support arms from said deployed position to said retracted position against downward forces selected less than a predetermined threshold force, an elongated spindle coupled to the longitudinal edge portion of the tarpaulin and being supported for movement in a substantially horizontal orientation, a drive for selectively journaling the spindle in rotational movement, whereby rotation of the spindle by the drive coils or uncoils the longitudinal edge portion of the tarpaulin about the spindle to position said tarpaulin between the extended and the retracted positions, and wherein the predetermined threshold force is selected as a downward rotational torque force of a combined weight of said spindle and coiled longitudinal edge portion of said tarpaulin at a force equivalent point along said rafter support arms intermediate said inner and outer ends.

14. The enclosure system as claimed in claim 13, wherein each said rafter support arm includes an uppermost generally upwardly convex surface, and a stop member spaced a distance from said pivot axis towards said outer end, the stop member configured for limiting lateral movement of said spindle and coiled longitudinal edge portion therepast, the stop member being spaced a distance from said force equivalent point towards said pivot axis.

15. The enclosure system as claimed in claim 13, wherein the enclosure system is a side retractable enclosure system and said trailer bed comprises a substantially open flatbed truck trailer bed.

16. The enclosure system as claimed in claim 13, wherein said force equivalent point is spaced from said pivot axis by a distance selected at between about 40% and about 70% of along the overall length of the rafter support arm.

17. The enclosure system as claimed in claim 13, wherein the lift assembly comprises one or more of a torsion spring, a compression spring, a telescoping gas strut, and a telescoping pneumatic strut and combinations thereof.

18. The enclosure system as claimed in claim 13, wherein in said retracted position, the second outer ends of the rafter support arms being raised vertically about 20 cm to about 60 cm from the deployed position.

19. The enclosure system as claimed in claim 18, wherein the support assembly comprises a support post mounted to and extending vertically from a longitudinally central portion of said bed surface, and a rafter arm in movement between said deployed and raised positions.

20. The enclosure system as claimed in claim 19, further including a brace arm associated with each said support post, the brace arm extending laterally from a lower first end coupled to said post, to an uppermost outward end, the uppermost outward end being positioned to supporting engage an underside an associated rafter support arm in said deployed position, and wherein the outward end further includes a selectively extendible arm engagement member.

21. The enclosure system as claimed in claim 13, wherein said lift assembly comprises a biasing member configured to translate a resilient biasing force to a contact point of said associated rafter support arm, and adjustment mechanism for selectively varying the resilient biasing force on the associated rafter support arm.

* * * * *